US008015091B1

(12) United States Patent
Ellis

(10) Patent No.: US 8,015,091 B1
(45) Date of Patent: *Sep. 6, 2011

(54) ANALYZING INVESTMENT DATA

(75) Inventor: Margaret Sue Ellis, Denver, CO (US)

(73) Assignee: Clayton Fixed Income Services, Inc., Denver, CO (US)

( * ) Notice: Subject to any disclaimer, the term of this patent is extended or adjusted under 35 U.S.C. 154(b) by 2092 days.

This patent is subject to a terminal disclaimer.

(21) Appl. No.: 09/991,762

(22) Filed: Nov. 21, 2001

(51) Int. Cl.
*G06Q 40/00* (2006.01)
(52) U.S. Cl. ............... 705/36 T; 705/35; 705/38
(58) Field of Classification Search .......... 35/35, 36 T, 35/38
See application file for complete search history.

(56) References Cited

U.S. PATENT DOCUMENTS

| | | | |
|---|---|---|---|
| 5,699,527 A | 12/1997 | Davidson | |
| 5,930,775 A * | 7/1999 | McCauley et al. | 705/36 R |
| 6,321,212 B1 | 11/2001 | Lange | |
| 6,401,070 B1 | 6/2002 | McManus et al. | |
| 6,654,727 B2 * | 11/2003 | Tilton | 705/36 R |
| 6,684,196 B1 * | 1/2004 | Mini et al. | 705/26 |
| 7,062,458 B2 * | 6/2006 | Maggioncalda et al. | 705/36 R |
| 2001/0029482 A1 | 10/2001 | Tealdi et al. | |
| 2001/0042034 A1 | 11/2001 | Elliott | |
| 2001/0044773 A1 * | 11/2001 | Sellers et al. | 705/38 |
| 2001/0054022 A1 | 12/2001 | Louie et al. | |
| 2002/0007342 A1 | 1/2002 | Sellers et al. | |
| 2002/0035520 A1 * | 3/2002 | Weiss | 705/27 |
| 2002/0052820 A1 * | 5/2002 | Gatto | 705/36 |
| 2002/0059136 A1 * | 5/2002 | May | 705/38 |
| 2003/0018558 A1 * | 1/2003 | Heffner et al. | 705/37 |
| 2003/0074306 A1 * | 4/2003 | Rios et al. | 705/38 |
| 2003/0130933 A1 | 7/2003 | Huang et al. | |
| 2007/0043654 A1 | 2/2007 | Libman | |

OTHER PUBLICATIONS

Luke T Miller, Chan S Park. Decision making under uncertainty—real options to the rescue? The Engineering Economist. Jan. 1, 2002;47(2): 105-150. In: ABI/INFORM Global [database on the Internet] [cited Mar. 21, 2011 ]. Available from: http://www.proquest.com/; Document ID: 128466341.*
Robert I Mehr, Stephen W Forbes. The Risk Management Decision in the Total Business Setting :Abstract. Journal of Risk and Insurance (pre-1986). Sep. 1, 1973;40(3): 389. In: ABI/INFORM Global [database on the Internet] [cited Mar. 21, 2011]. Available from: http://www.proquest.com/; Document ID: 677832301.*
Restriction Requirement, U.S. Appl. No. 09/992,348, Jan. 22, 2007, 6 pages.
Amendment and Response to Restriction Requirement, U.S. Appl. No. 09/992,348, Feb. 21, 2007, 12 pages.
Non-Final Office Action, U.S. Appl. No. 09/992,348, May 23, 2007, 16 pages.
Response to Office Action, U.S. Appl. No. 09/992,348, Sep. 5, 2007, 5 pages.

(Continued)

*Primary Examiner* — Olabode Akintola
*Assistant Examiner* — Muriel Tinkler
(74) *Attorney, Agent, or Firm* — Polsinelli Shughart, PC

(57) ABSTRACT

A system and method for analyzing loan data to identify risk. In a database, loan data is stored with one or more associated characteristics. The system includes a risk filtering engine is in communication with the database so that a user may apply one or more risk filters to the loan data to identify particular loans with particular risk characteristics. The system further includes a loss estimation engine for providing an estimated loss for each loan, a probability of loss engine for determining a probability of loss for each loan, and a loss list engine for generating a list of loans with heightened risk of loss.

19 Claims, 18 Drawing Sheets

OTHER PUBLICATIONS

Final Office Action, U.S. Appl. No. 09/992,348, Nov. 16, 2007, 17 pages.
Amendment and Response to Office Action, U.S. Appl. No. 09/992,348, Mar. 17, 2008, 12 pages.
Non-Final Office Action, U.S. Appl. No. 09/992,348, May 7, 2008, 18 pages.
Amendment and Response to Office Action, U.S. Appl. No. 09/992,348, Nov. 24, 2008, 15 pages.
Final Office Action, U.S. Appl. No. 09/992,348, Feb. 11, 2009, 17 pages.
Amendment and Response to Final OA, U.S. Appl. No. 09/992,348, Aug. 11, 2009, 17 pages.
Non-Final Office Action, U.S. Appl. No. 11/871,316, Dec. 30, 2008, 11 pages.
Amendment and Response to Non-Final Office Action, U.S. Appl. No. 11/871,316, Jun. 26, 2009, 11 pages.
Terminal Disclaimer, U.S. Appl. No. 11/871,316, Jun. 26, 2009, 1 page.
Non-Final Office Action, U.S. Appl. No. 11/871,431, Sep. 24, 2008, 16 pages.
Amendment and Response to Non-Final Office Action, U.S. Appl. No. 11/871,431, Mar. 24, 2009, 10 pages.
Non-Final Office Action, U.S. Appl. No. 11/871,483, Jul. 23, 2008, 10 pages.
Amendment and Response to Non-Final Office Action, U.S. Appl. No. 11/871,483, Nov. 24, 2008, 5 pages.
Final Office Action, U.S. Appl. No. 11/871,483, Feb. 26, 2009, 11 pages.
Non-Final Office Action, U.S. Appl. No. 11/871,548, May 28, 2008, 11 pages.
Amendment and Response to Non-Final Office Action, U.S. Appl. No. 11/871,548, Nov. 26, 2008, 7 pages.
Final Office Action, U.S. Appl. No. 11/871,548, Mar. 18, 2009, 12 pages.
Amendment and Response to Restriction/Election Requirement, U.S. Appl. No. 11/871,277, Jun. 9, 2010, 13 pages.
Co-op Final Service Staff, ATM Processing Brochure, Co-op, web, pp. 1-2.
Election Requirement, U.S. Appl. No. 11/871,277, Mar. 9, 2010, 8 pages.
Amendment and Response to Final Office Action, U.S. Appl. No. 09/992,348, Aug. 11, 2009, 17 pages.
Notice of Allowance, U.S. Appl. No. 09/992,348, Nov. 16, 2009, 6 pages.
Amendment and Response to Final Office Action, U.S. Appl. No. 11/871,483, Aug. 26, 2009, 6 pages.
Non-Final Office Action, U.S. Appl. No. 11/871,483, Nov. 18, 2009, 12 pages.
Amendment and Response to Non-Final Office Action and Applicant Summary of Interview, U.S. Appl. No. 11/871,483, May 17, 2010, 6 pages.
Interview Summary, U.S. Appl. No. 11/871,483, May 20, 2010, 4 pages.
Non-Final Office Action, U.S. Appl. No. 11/871,346, Nov. 30, 2009, 8 pages.
Response to Notice of Non-Complaint Amendment, U.S. Appl. No. 11/871,431, Jul. 10, 2009, 7 pages.
Notice of Allowance, U.S. Appl. No. 11/871,431, Nov. 19, 2009, 6 pages.
Final Office Action, U.S. Appl. No. 11/871,316, Nov. 9, 2009, 13 pages.
Amendment and Response to Final Office Action, U.S. Appl. No. 11/871,316, Jan. 11, 2010, 7 pages.
Supplemental Final Office Action, U.S. Appl. No. 11/871,316, Jan. 27, 2010, 13 pages.
Advisory Action, U.S. Appl. No. 11/871,316, Feb. 12, 2010, 2 pages.
Amendment and Response to Final Office Action and Advisory Action, U.S. Appl. No. 11/871,316, May 27, 2010, 10 pages.

* cited by examiner

Loan Information:          Last Updated: MO/DAY/YEAR 4:1:25 PM

| | | | |
|---|---|---|---|
| Portfolio: | TIAA | Bond Name: | 1 |
| Origination: | 999 | Address: | 123 E Pacific Pkwy Dr So Denver CO 80202 |
| Borrower Name: | John_Doe | | |
| Borrower Number: | 10 | | |
| Servicer: | XYZ | Originator: | ABC |
| Watch List: | ☑ | | |
| | | Status Code: | 30 |
| | | Default Reason: | Bankruptcy |

☐ Servicer Error    ☑ MI Error    ☑ Payment Plan    ☐ BK

Origination Information:

| | | | |
|---|---|---|---|
| Origination Date: | 1/1/1999 | Property Type: | SINGLE FAMILY ATTACH |
| Mortgage Term: | 10 | Occupancy: | Investment |
| Original Amount: | 150000 | Product Type: | Aro |
| Appraisal Value: | 265000 | Purpose: | Construction Permanent |
| Orig P and t: | 2 | Documentation: | Full |
| LTV: | 0 | PMI Code: | Y8 |
| FICO: | 12 | As of Date: | 1/1/2001 |
| Original Rate: | 9.7 | Lien: | 1 |
| 1st Pymt. Dt.: | 1/12/1996 | | |

Current Information:

| | | | |
|---|---|---|---|
| Current Balance: | 1000 | Our int. Rate: | 10 |
| Valuation: | Appraisal | Sch P and t: | 2336.23 |
| Current Value: | 456214 | Valuation Date: | 5/14/1999 |
| Last Int Paid Dt: | 11/12/1999 | Delinquency: | 999 |
| Est. Loss: | -12691 | Default Probability: | 25 |
| Est. Severity: | 0 | MI: | ☑ |
| Cart: | B | MI Company: | Mortgage Comp 1 |
| Coverage: | 8 | | |

[ Save Changes ]    [ Cancel ]

FIG.2

| LOAN NUMBER | FIRST PAYMENT DATE | PAID TO DATE | STATE | ZIP | CURRENT VALUATION METHOD | ORIGINAL APPRAISAL CURRENT VALUE | ORIGINAL AMOUNT CURRENT BALANCE | ORIGINAL LTV CURRENT LTV | ESTIMATED (LOSS) OR GAIN ESTIMATED SEVERITY | ESTIMATED LIQUIDATION DATE | DELINQUENCY HISTORY |
|---|---|---|---|---|---|---|---|---|---|---|---|
| 0000091700 | 1/1/98 | 6/1/98 | CO | 80465 | SALES PRICE 2/25/00 | $334,000 $393,000 | $317000 $0 | 95.0 00 | $406,701 -128.81% | 3/1/00 | C36F999FFFFRR0 |
| 0007658917 | 1/1/98 | 6/1/98 | FL | 33138 | BPO-4/4/00 | $301,000 $565,000 | $240,800 $239,774 | 80.0 42.4 | 169,227 -70.28% | 6/1/01 | C36F99999999999999F |
| 0007659428 | 2/1/98 | 9/1/99 | OR | 97007 | APPRAISAL 1/12/00 | $343,000 $349,000 | $274,400 $270,034 | 80.0 77.2 | ($8,716) 3.18% | 1/1/01 | CCCCCCCCC36FFFFF |
| 0031358799 | 2/1/98 | 6/1/99 | CA | 91423 | INTERNAL ESTIMATE | $370,000 $365,737 | $296,000 $292,609 | 80.0 80.0 | ($48,028) 16.23% | 9/1/01 | XXXXXXCC36CC69FEFF999 BK |

FIG.4

Enter Issuer Loan Number:
[_____] [search]
filters

Filters                                           Collapse All  Expand All
☐ Level 1                                                              _▢
Source    [Select a source... ▽]  Source Results [_____]
Watch List [___▽]                                [_____]
Hot List   [__]
                                                        [Get Servicer]

☑ Level 2-Status                                                       _▢
| Status | Delinquency | Watch List Status |
|---|---|---|
| Select Status... | Select Delinquency | Select Watch List Status... |
| Liquidation | Foreclosure | Pending Info |
| Contest MI Claim | 30 | Active |
| Reinstated | 90 | Monitor |

☑ Level 3-Risk                                                         _▢
| Purpose | Occupancy | Loan Type | Doc Level |
|---|---|---|---|
| Select Purpose... | Select Occupancy | Select Loan Type... | Select Doc Level |
| CashOut Refinance | Investment | Fixed | Full |
| Purchase | Primary | Arm | Low |
| Rate/Term Refinance | Second Home | Stepped | None |

| Product | Property Type |
|---|---|
| Select Product... | Select Property Type... |
| Prime | 2-Family |
| Sub Prime | 3-Family |
| Alternative | 4-Family |

MI             [__▽]
LTV            [_____] % To [_____] %
Original FICO  [_____] To [_____]
Balance      $ [_____] To $ [_____]

FIG.13A

| | | | |
|---|---|---|---|
| Balance | $ [____] To $ [____] | | |
| Balance-Current | $ [____] To $ [____] | | |

☐ Level 4-Loss Exposure _ ☐

| | | |
|---|---|---|
| Est Loss | $ [____] To $ [____] | |
| Est Severity | [____] % To [____] % | |
| Probability | [____] % To [____] % | |
| Actual Loss | [____] To [____] | |
| Actual Severity | [____] To [____] | |

☐ Level 5-Property _ ☐

Geographic Risk: | Value Risk:
---|---
Zip [____] | Decline-Act. [____] To [____]
State [▽] | Decline-Est. [____]
 | Issue
 | Select Property Issue...
 | Damage
 | Winterization
 | Insured ☐ Level 6-Borrower _ ☐

| | | | | | |
|---|---|---|---|---|---|
| Last Name | [____] | Fraud Suspect | [▽] | Multiple BK | [____] |
| Litigation | [▽] | RFD | [_____] | | [▽] |

☐ Level 7-Loan History _ ☐

| | | | | | |
|---|---|---|---|---|---|
| Exceeds Timeline | [____] [▽] | Paid Off | ☐ | BK Chapter | [____] [▽] |
| Unusual String | [____] [▽] | Delay Status | [____] [▽] | | |
| Time in Status | [____] [▽] | [____] | < Number of Months in Status | | |
| End Date Expiring | [____] [▽] | [____] To [____] | | | |
| LIPD | [____] To [____] | | | | |

☐ Level 8-Underwriting _ ☐

Internal Review [____] [▽]  Servicer Review [____] [▽]  Other Review [____] [▽]

FIG.13B

☐ Level 9-MI

| Mortgage Insurer | [▼] | Pending ☐ | | MI Type | [▼] |
| MI Loss | [▼] | MI Issues | [▼] | | |
| MI Severity | | To | | | |

☐ Level 10-Recoveries

Recovery Expected $[       ] To $[       ]
Recovery Actual   $[       ] To $[       ]

☒ Level 11-Servicing

| Trustee/Reporting Issue | [       ] | Repurchase | [       ] |
| Foreclosure Delay | [       ] | Servicing Issue | [       ] |

[ Submit ]

Terms of Use | Back To Top

FIG.13C

ANALYZING INVESTMENT DATA

REFERENCE TO RELATED APPLICATIONS

This application is related to co-pending commonly assigned application Ser. No. 09/992,348 entitled "Credit Risk Managing Loan Pools,", filed on Nov. 21, 2001, which is hereby incorporated by reference in its entirety.

FIELD OF THE INVENTION

The present invention relates to analyzing investment data. In particular, the present invention provides a comprehensive tool useful for filtering a loan pool to identify characteristics of the loan pool and loans in the pool.

BACKGROUND

Most home buyers and buyers of other types of property, such as automobiles, boats, intangible assets, and the like, obtain a loan from a mortgage loanee or other lender for some or all of the purchase price for the property. Referring particularly to mortgage loans, oftentimes the mortgage loanee sells the mortgage loan to a mortgage loan purchaser after the buyer closes on the purchase. In return for the sale of the mortgage loan, the mortgage loanee receives a fee from the mortgage loan purchaser. One reason mortgage loanees sell the mortgage loan is to ensure that they have funds to provide mortgage loans to future buyers.

The purchaser of the mortgage loan generally pools a number of mortgage loans, typically 1,000-1,500 mortgage loans, and securitizes the pooled mortgage loans. Securitizing the pool includes issuing a bond, and selling the bond to an investor where the collateral for the bond is the mortgage loans. Investors who have purchased an interest in the bond receive a payment, generally monthly, that is a portion of the aggregate of the payments made on the mortgage loans. Other purchasers hold mortgage loan pools indefinitely, where the purchaser remains the investor in the mortgage loans.

The investor purchases the bond with the hope that the yield over the life of the bond exceeds what was paid for the bond. Investors make money on mortgage loan pools, whether securitized or not, by acquiring them at a price that will bring a targeted yield. For example, a pool of mortgage loans that has a weighted average coupon of 9% will result in a payment stream of 8% (coupon less the fees paid to the servicer and trustee who administer the mortgage loans) as long as the mortgage loans remain outstanding. Most mortgage loans have a thirty year life. If the investor paid 100 cents on the dollar for the pool (for example, if a pool of ten mortgage loans of $100,000 each, with an aggregate balance of $1 million were acquired for $1 million), then the yield would be 8% (8% interest rate×$1 million). If the investor paid less, say 90 cents on the dollar or $900,000, for the same pool, then the yield would be more (8% coupon×$1-million face=$80,000÷$900,000 paid=8.8%).

Generally, investors pay less for mortgage loan pools that carry greater credit risk. Credit risk results from borrowers defaulting on their mortgage loans, i.e., not making payments on the mortgage loan. When this occurs, the mortgage loan is foreclosed, the property is sold, and the sales proceeds are used to pay off as much of the mortgage loan as possible. If proceeds are not enough to pay all of the mortgage loan off, then the difference is a loss. The investor's principal, or investment amount, is reduced by the loss. Thus, for example, the payment received becomes $72,000 (8%×9 loans×$100,000), on an investment that cost $900,000, which brings a yield of 8% ($72,000÷$900,000). The sales proceeds are also returned to the investor. If net proceeds were $20,000, then the investor's invested amount becomes $880,000 ($900,000 paid less returned proceeds of $20,000) and the yield is $72,000÷$880,000, or 8.2%.

Generally, foreclosure action may begin when a mortgage loan becomes 90 days delinquent, i.e., no payments have been made for 90 days. A typical loss for a foreclosed mortgage loan is 33%, which would result in a loss of $33,000 for the foreclosure of a $100,000 mortgage loan. When a mortgage loan is foreclosed, the servicer takes ownership of the property on behalf of the investor and then lists the property for sale. Generally, the list price is approximately the appraised value for the property. The servicer, however, will generally accept less than the listed price for the property in order to quickly sell the property. Realtors are aware of this, and typically counsel their clients to offer less than the list price, which is oftentimes accepted by the servicer and may result in a loss to the investor if the proceeds from the sale do not exceed the outstanding mortgage loan amount.

Another loss that is incurred by the investor stems from missed interest payments. Each missed payment, on an eventually foreclosed mortgage loan, results in a lost interest payment for the investor. However, the industry practice is for the servicer to continue to advance, or pay from its own funds, interest to the investors until the mortgage loan is ultimately foreclosed and the amount of the loss is booked. At that time, the servicer repays itself from the sales proceeds, and the difference is booked as a loss against the investor's investment balance. Accordingly, the longer a foreclosure process takes the more losses that are incurred. Moreover, the longer it takes to identify a mortgagor that is behind on his or her payment, and the longer it takes to assist the mortgagor in correcting his or her difficulty in making payment, if correction is at all possible, then the more likely that significant losses will be incurred if the mortgagor eventually cannot make the mortgage loan payments. Generally, all of the losses are ultimately passed on to the investors. The best result for the investor is when a borrower having difficulty making payments resolves the problem and does not default.

Investors typically have access to only aggregate statistics for a bond. For example, an investor may have access to a delinquency statistic for the entire bond, e.g., 3% of the mortgagors are behind on their payments. The investor, however, does not have access to information regarding each mortgage loan in the pool. Accordingly, the investor has no way of knowing with any certainty whether significant losses will actually be incurred. By not having detailed information, and a format in which to easily digest the detailed information, the investor must rely on generalized assumptions in assessing the performance of a pool. As an example, two identical pools could each have a single $100,000 mortgage loan in default or loss. Without any additional information, the investor would assume a 33% loss on each mortgage loan, or $66,000 in total, but would not know with any certainty whether the loss would actually occur.

It is against this background that embodiments of the invention were developed.

SUMMARY OF THE INVENTION

Credit risk management involves analyzing loans associated with a pool of loans to reduce losses and preserve investors' yield at the highest level for as long as possible. Loss mitigating activities may be directed at any aspect of a particular loan or pool of loans that poses a risk of loss for the investor. For example, loss mitigating activities may be directed at identifying risky loans before any losses occur to help insure that losses are avoided altogether, helping a borrower having difficulty making payments avoid foreclosure, expediting the foreclosure process to minimize the number of missed interest payments, assuring that the highest possible sales price is obtained for a property that has been foreclosed, and identifying a risky pool of loans that an investor may be considering investing in. Aspects of the present invention provide various analytic tools applicable to credit risk management of loan pools, analyzing loan pools for investment purposes, and other pursuits.

One aspect of the present invention involves a method for obtaining an estimated financial outcome, such as a gain or a loss, for a pool of loans. The estimated financial outcome is first calculated for each loan in the pool and then each individual estimated financial outcome is aggregated to obtain the estimated financial outcome for the pool. Thus, the present invention provides financial outcome or loss estimate information for investors both at the loan level and at the pool level. Moreover, the present invention accumulates and uses various statistics at the loan level for estimating the financial outcome thus providing detailed loan level attributes useful for assessing risk.

In one example, the financial outcome estimation method includes obtaining an estimated value for a property associated with a loan from the pool, and obtaining an estimated net proceeds amount from a sale of the property associated with the loan. The method further includes obtaining an estimated liquidation time between a last interest paid date for the loan and a receipt of the net proceeds from the sale of the property, and obtaining an estimated total debt amount for the loan. In one example, the estimated net proceeds is a function of the estimated value for the property, and the estimated total debt is a function of the estimated liquidation time. To obtain the estimated financial outcome from the sale of the property, at the loan level, the method includes deriving the difference between the estimated net proceeds and the estimated total debt. To obtain the estimated financial outcome for the pool, the method further includes applying the estimated financial outcome from the sale of the property associated with the loan to the pool, such as by aggregating the individual estimated financial outcomes.

The operations of obtaining an estimated value for the property and obtaining an estimated liquidation time, in one example, include applying a decision tree to obtain the estimated value for the property and the estimated liquidation time, respectively. One advantage of this aspect of the present invention, is that the decision trees can produce independently useful results along each branch. For example, applying a decision tree to obtain the estimated property value in one embodiment includes the operations of obtaining a list price for the property and obtaining an appraisal for the property. Then, the estimated value for the property is set as the lesser of the list price and the appraisal. Each branch of the decision tree produces a result that is useful for some aspect of credit risk managing loan pools. For example, if a mortgagor is having difficulty making his or her monthly payments and the estimated value of a property is substantially less than the original value of the property, i.e., what it was bought for, then aggressive risk management techniques, such as putting the mortgagor on a payment plan, might be in order to avoid foreclosure and a loss for the pool. In another example, when a loan goes to foreclosure, it becomes real estate owned and is sold. Many times servicers look to sell these properties quickly and sometimes accept offers that are substantially less than the fair market value for the property. A credit risk manager can compare the list price for the property with the appraisal value for the property and identify large discrepancies, and then determine if a particular servicer is accepting offers for substantially less than the appraised value for the property.

Another aspect of the present invention involves a method for determining a probability of loss for a loan from the sale of a property associated with the loan. The probability of a loss is useful alone or in conjunction with the estimated loss. For example, an investor may analyze two loans from separate pools each having an estimated loss of $100,000, for an aggregate estimated loss to the investor of $200,000. The probability of loss, however, for the first loan may be 0% and the probability of loss for the second loan may be 50%. Thus, the aggregate estimated loss adjusted for probability for both loans is $50,000 ((0×$100,000)+(50%×$100,000)). With this information the investor understands his or her true risk, which is zero for the first loan and $50,000 for the second loan. The investor can use this information to determine which pool the investor should retain, which pool should be sold, or which seller should be preferred over another. Moreover, with the probability of loss information credit risk management techniques may be focused on the loan with a 50% probability of loss to both reduce the estimated loss and the probability of loss for that loan rather than expending credit risk management techniques on the loan with a zero probability of loss.

In one example, the probability of loss method includes assigning a base probability of loss to the loan and obtaining at least one characteristic of the loan. Then, a probability factor to account for the characteristic of the loan is determined and added to the base probability factor. The characteristics of the loan for which probability factors may be added to the base probability factor include the delinquency status of the loan (e.g., current, 30 days delinquent, 60 days delinquent, 90 days delinquent, first month of foreclosure proceedings, more than one month after the start of foreclosure proceedings, real estate owned, and realized loss), the current loan to value ratio (CLTV) for the loan, the loan type, the property type, any bankruptcy associated with the loan, whether the loan is a low document loan or a FICO loan, whether there is a property issue associated with the loan, whether there was an early payment default, the financing of the loan, and whether there was an exception in the underwriting process.

Another aspect of the invention involves a computer system for credit risk managing a loan pool including at least one loan for a property. In one example, the computer system includes a loss estimation engine for estimating a loss for the at least one loan, and a probability of loss engine for determining a probability of loss for the at least one loan. The loss estimation engine includes a property value estimation module for estimating a value for the property, a net proceeds estimation module for estimating a net proceeds from a sale of the property, a liquidation timing module for estimating a liquidation time between a last interest paid date for the loan and a receipt of the net proceeds from the sale of the property, and a total debt module for estimating a total debt for the loan. The probability of loss engine includes a base probability module for assigning a base probability of loss to the loan, a loan characteristic module for obtaining at least one characteristic of the loan, a probability factor module for determining at least one loss probability factor associated with the loan, wherein the at least one probability factor accounts for the at least one actual characteristic of the loan, and a summation module for summing the at least one probability factor with the base probability of loss, wherein the summation yields the probability of loss for the loan.

Another aspect of the present invention includes a method for generating a loss list for a set of loans that includes accessing a database storing an electronic record of the set of loans including a subset of at least one delinquent loan. The delinquent loan data includes an indication of delinquency and an indication of a value of the property associated with the delinquent loan. The value of the property associated with the delinquent loan is compared with a threshold value, and added to the loss list if the value meets (e.g., equal to or exceeding) the threshold value. The loss list is generally a generated list of loans that each have some particular indication of a risk of loss, such as being 90 days delinquent. The loss list method may further include adding all subprime loans with any delinquent status to the loss list. Aspects of the present invention allow a credit risk manager or other user to add a loan to a watch list of loans that have some heightened risk of loss determined by the person that added the loan to the watch list. The loss list method may further include an operation of adding each loan in the watch list to the loss list.

Another aspect of the present invention includes a method for credit risk managing a loan pool with at least one loan having an associated property. The credit risk management method includes accessing a database storing an electronic record of the loan pool with an electronic record of at least one loan having an associated at least one characteristic. The method further includes receiving a selection of at least one risk filter associated with the at least one characteristic and applying the selected at least one risk filter to the electronic record of the loan pool. Then, displaying each of the at least one mortgage loans having the characteristic of the at least one applied risk filter.

Each loan in a pool may have numerous different characteristics associated with it in the database, such as the source of the loan, the status of the loan, the loan terms, the type of property the loan was obtained for, characteristics of the borrower, any servicing issues associated with the loan, the loan history, the mortgage insurer associated with the loan and mortgage insurance issues, any loss exposure associated with the loan, unusual strings, and recovery characteristics. The risk filters are used alone or in conjunction with other risk filters to identify a loan or loans in the pool having particular risk factors. For example, a set of loans in the pool may have a loan history characteristic of being in 60 days delinquent (filtered with a 60 day delinquent filter), may have a loss exposure characteristic of a high loss estimate (filtered with a loss estimate filter), and a high probability of loss (filtered with a probability of loss filter). This set of loans is identified with the appropriate combination of filters. After identification, appropriate credit risk management techniques may be applied to help avoid additional losses or the realization of a loss associated with these loans, such as putting the borrower on a payment plan to help them avoid foreclosure.

Another aspect of the invention involves a method for analyzing an electronic record of a loan pool wherein the loan pool includes an electronic record of at least one loan having an associated property. The method includes obtaining an estimated liquidation time between a last interest paid date for the at least one loan and a receipt of a net proceeds from a sale of the property. The estimated liquidation time is associated with the electronic record of the at least one loan. A liquidation time filter may then be applied to the electronic record of the loan pool to identify each at least one loan with a specified estimated liquidation time. For example, the credit risk manager may want to see all loans with a specified liquidation time of 1 year, and all such loans in the loan pool with a 1 year liquidation time will be identified.

In one example, the liquidation time is obtained by applying a liquidation time value decision tree. Each branch of the decision tree produces a time factor involved in the overall liquidation time determination, and each time factor is associated with the electronic record of the loan. The loan pool may be analyzed to identify loans with any specified time factor or set of time factors. In one example, the applied liquidation time value decision tree produces a payment plan time factor, a bankruptcy proceeding time factor, a litigation time factor, foreclosure proceedings time factor, a delinquency status time factor, and a marketing period time factor. Each loan in the pool with any specified time factor or combination of time factors may be identified with the appropriate filter or combination of filters.

Another aspect of the invention involves a method for analyzing an electronic record of a loan pool wherein the loan pool includes an electronic record of at least one loan having an associated property. The method includes the operations of obtaining an estimated financial outcome for each of the at least one loans; associating the estimated financial outcome with the electronic record of each of the at least one loans; and applying at least one estimated financial outcome filter to the electronic record of the loan pool to identify each of the at least one loans with a specified financial outcome. For example, all loans in the pool with an estimated loss of $50,000 or more may be identified.

In one example, obtaining an estimated financial outcome for each of the at least one loans includes the operations of obtaining an estimated value for a property associated with each of the at least one loans; obtaining an estimated net proceeds amount from a sale of the property associated with each of the at least one loans; obtaining an estimated liquidation time between a last interest paid date for each of the at least one loans and a receipt of the net proceeds from the sale of the property associated with each of the at least one loans; obtaining an estimated total debt amount for each of the at least one loans; and deriving the difference between the estimated net proceeds and the estimated total debt to yield an estimated financial outcome from the sale of the property associated with each of the at least one loans.

The method for analyzing an electronic record of a loan pool may further include obtaining a probability of loss for each of the at least one loans; and applying at least one probability of loss filter to the electronic record of the loan pool to identify each of the at least one loans with a specified probability of loss. In addition, loans with a specified estimated decline may be identified by obtaining an original appraisal value for the property; subtracting the estimated value of the property from the original appraisal value; dividing the result from the operation of subtracting to obtain an estimated decline; and identifying each of the at least one loans with a specified estimated decline with an estimated decline filter. Furthermore, loan with a specified estimated loss severity may be identified by obtaining an original balance for each of the at least one loans; dividing the estimated financial outcome for each of the at least one loans by the original balance for each of the at least one loans to obtain an estimated loss severity for each of the at least one loans; and identifying each at least one loan with a specified estimated loss severity with a loss severity filter.

Another aspect of the invention includes a method for risk managing a set of related investments. The method includes accessing a database storing an electronic record of the set of investments. Each investment includes an indication of at least one risk characteristic for the investment. The method further includes applying at least one risk filter associated with at least one risk characteristic to the set of investments to identify each of the investments in the set of investments having the risk characteristic and obtaining an estimated loss for each of the identified investments. The method further includes deriving an estimated financial outcome for the identified investments upon liquidation of the identified investments as a function of the estimated loss for each of the identified investments. The method further includes obtaining a probability of loss for each of the identified investments.

These summarized aspects of the present invention and others are further described in the detailed description provided below.

BRIEF DESCRIPTION OF THE DRAWINGS

The detailed description will refer to the following drawings, wherein like numerals refer to like elements, and wherein:

FIG. 2 illustrates a credit risk manager user interface according to one embodiment of the invention;

FIG. 4 is a table illustrating some parameters included with the mortgage loan data;

FIGS. 12A-12C illustrate a method for determining a probability of a loss for a mortgage loan according to one embodiment of the invention; and FIGS. 13A-13C illustrate risk filter user interfaces according to one embodiment of the invention.

DETAILED DESCRIPTION

The invention will now be described in detail with reference to various embodiments thereof, with some aspects of the invention being described in the accompanying drawings. Numerous specific details are set forth in order to provide a thorough understanding of the invention. In some instances, specific values are presented in the various flowcharts. It will be apparent to those skilled in the art, however, that the invention may be practiced without some or all of the specific details, that operations may be rearranged, that some operations may be eliminated or performed in a different way, that some specific values may also be changed and that other changes may be made without departing from the spirit and scope of the present invention.

The following description refers particularly to application of the invention for analyzing and risk managing mortgage loan pools. However, it should be appreciated that aspects of the invention are applicable to a broad array of credit-backed assets such as credit cards, auto loans and other loans, and is not limited to only mortgage loans. Moreover, aspects of the invention are broadly applicable to analyzing and risk managing any class of investments.

Figure 1:
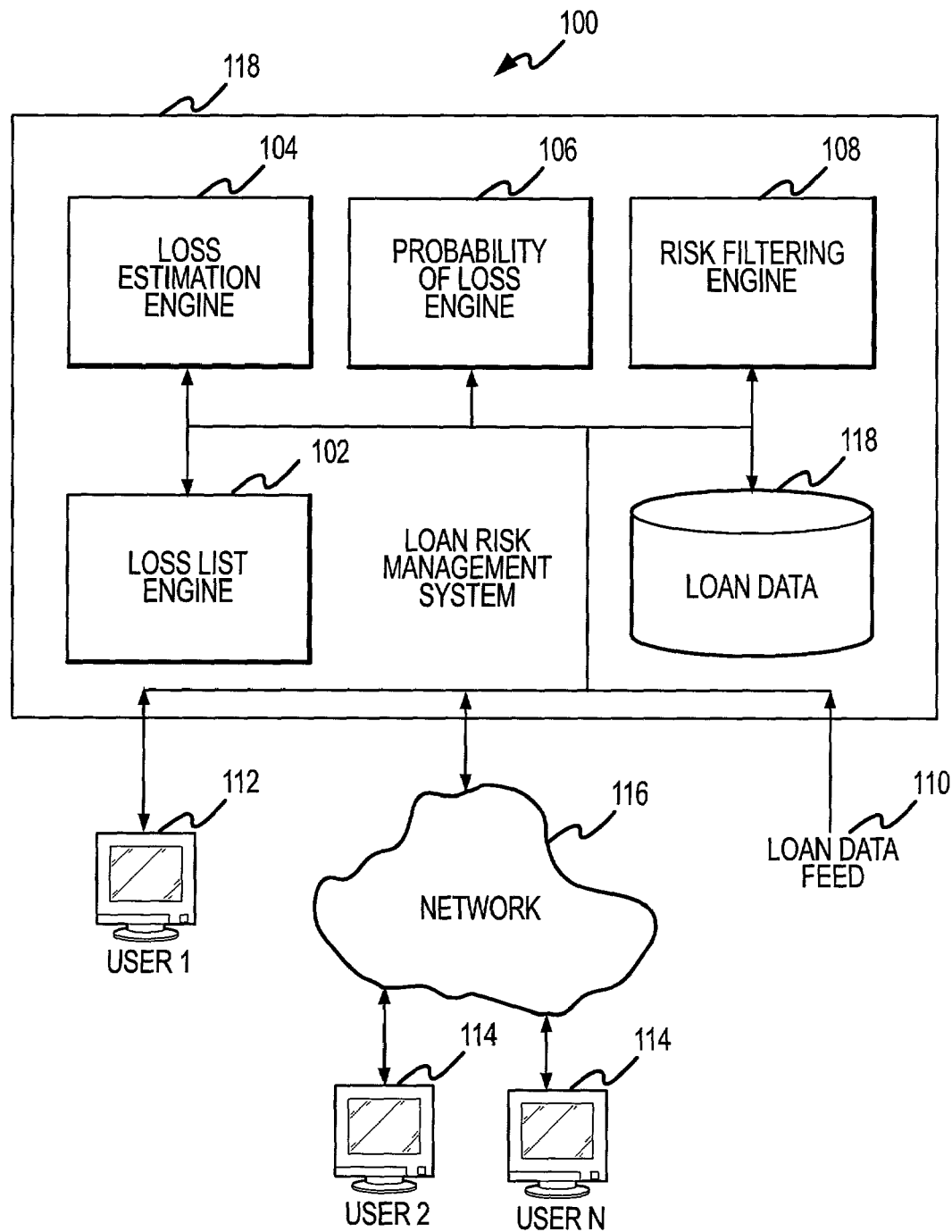
FIG. 1 is a block diagram illustrating a mortgage loan credit risk management system according to one embodiment of the invention, the system including a loss list engine, a loss estimation engine, a probability of loss engine, and a risk-filtering engine.

FIG. 1 is a block diagram illustrating a mortgage loan credit risk management system 100 according to one embodiment of the invention, the system 100 including a loss list engine 102, a loss estimation engine 104, a probability of loss engine 106, and a risk-filtering engine 108. The loss list engine 102 analyzes mortgage loan data 110 that is preferably received as a data feed or manually entered into the system, and generates a list of mortgage loans from a pool of mortgage loans that are at risk of going to loss. A mortgage loan that goes to loss is one in which the proceeds collected upon selling the property, after the servicer has taken back title to the property from the mortgagor, is less than the total amount of the mortgage loan, plus the costs associated with processing the foreclosure and selling the property (e.g., a mortgage loan with a $100,000 balance is foreclosed and the property sold for $20,000, resulting in a loss of $80,000). The loss list is generated by analyzing mortgage loan data information that suggests the mortgage loan will be defaulted on, such as delinquent payments.

The loss estimation engine 104, in one example, analyzes the mortgage loans in the loss list and provides an estimated loss for each mortgage loan should the mortgage loan be defaulted on. Although described herein as estimating losses for the mortgage loans in the loss list, the loss estimation engine 104 may also be used to analyze any other subset of mortgage loans including the entire mortgage loan pool. The probability of loss engine 106 preferably determines a probability of a loss for each mortgage loan in the loss list. The probability of loss used in conjunction with the loss estimate is useful, in part, for an investor to estimate a loss reserve.

Finally, the risk-filtering engine 108 is used to identify potentially troublesome mortgage loans in the pool by applying various risk filters to the pool. For example, the risk filtering engine may filter out all mortgage loans over $650,000 where the mortgagor has missed more than 6 payments in the past 12 months. Potentially risky mortgage loans, such as the preceding example, may be identified with the risk-filtering engine 108 and added to the loss list. In some examples, the risk filters can help to identify risky mortgage loans that are not otherwise identified by the loss list engine 102.

In one embodiment of the system, users 112 may be coupled to the system 100 locally such as by a serial connection, a local area network, or some other connection such as a Bluetooth™ wireless network. Additional users 114 may be coupled to the system from a remote location, such as by a wide area network or the Internet 116. Various levels of access to the system 100 may be provided through a password and user ID system as is known in the art. The system and related methods described below, in one example, are implemented as executable code residing on one or more servers 118. Application packages useful for implementing the present invention, in one example, may include Microsoft Windows 2000 Server™, Microsoft VisualStudio 6.0 Enterprise (Server Pack 4.0)™, Microsoft WAST (Web Application Stress Tool)™, Macromedia Flash 4.0™, Seagate Crystal Reports 8.5 (Developer Edition)™, and SQL 7.0 (Service Pack 2.0)™. Hardware useful in implementing the present invention, in one example, may include Dell PowerEdge™ 300 and 2450 Intel™ Pentium 3™ based machines with 128 MB to 512 MB RAM, and from 1:20 GB Hard Drive to 3:9 GB Hard Drives each. The application packages and hardware are not intended to limit the scope of the invention as defined in the claims, as the application packages and hardware may be substituted to implement the present invention by one of ordinary skill in the art.

FIG. 2 illustrates a credit risk manager user interface 200 of the system 100, which includes a mortgage loan information section 202, an origination information section 204, and a current information section 206. The credit risk manager user interface 200 displays a particular mortgage loan's characteristics, which are stored in the database 118, and displays many of the results generated by the engines (102, 104, 106, 108). In one example, the mortgage loan information section 202 includes the pool or security that a mortgage loan is included in, and the name and address of the mortgagor (borrower). The current information section 206 includes information about the mortgage loan such as the estimated loss from the loss estimation engine and the loss probability from the probability of loss engine. The system introduced above and the various engines used to generate the data displayed in the credit risk manager user interface 200 and other user interfaces are described in more detail below.

I. Loss List Engine

Figure 3:
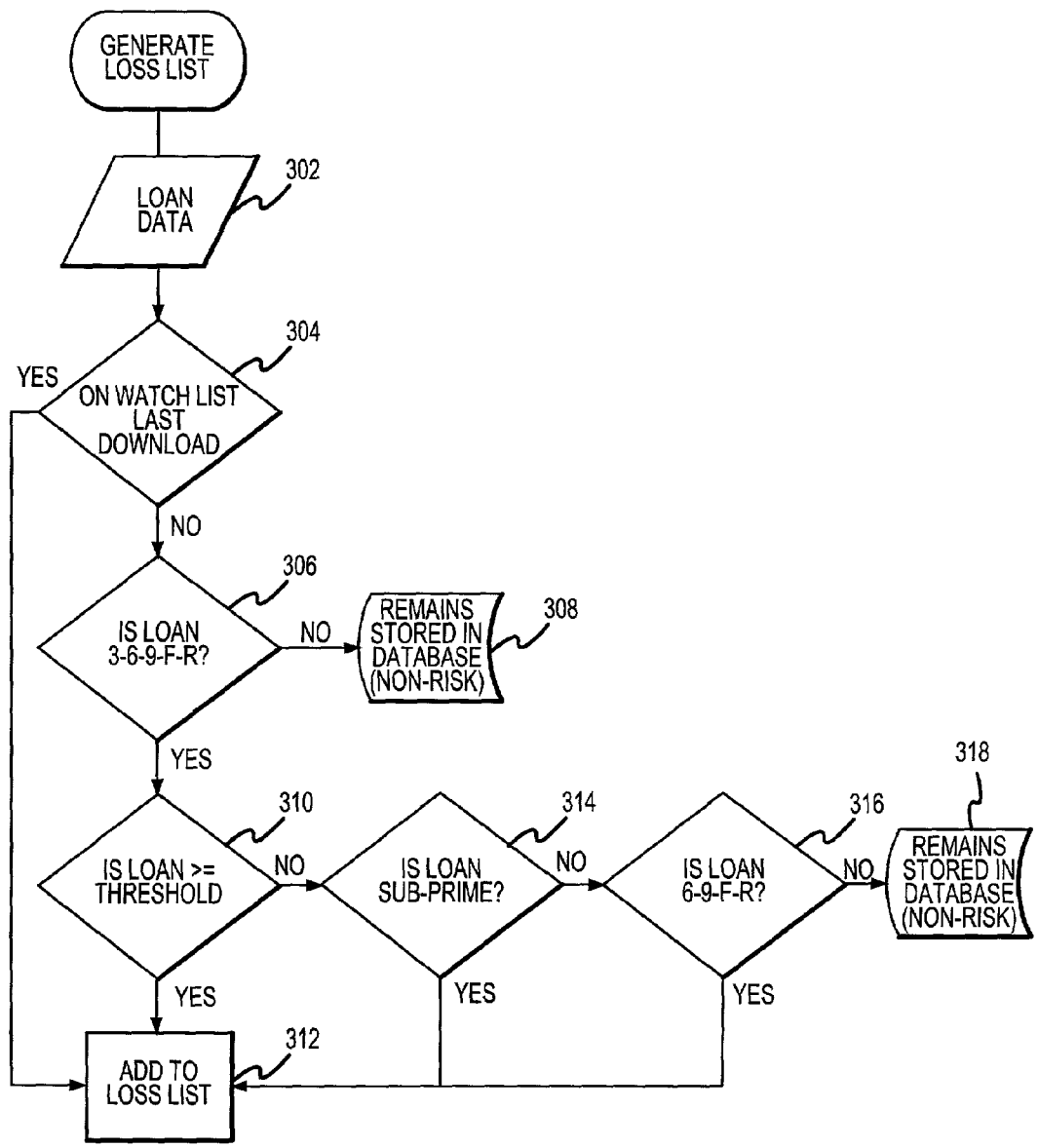
FIG. 3 is a flowchart illustrating a method for generating a loss list according to one embodiment of the invention.

The loss list engine 102, in one example, includes executable software program code to implement a method for generating a list of loans that are at risk of going into loss. FIG. 3 is a flowchart illustrating one method for generating the loss list according to one embodiment of the invention. Generally, a delinquent mortgage loan is any mortgage loan where a payment is not made in a timely manner. In the method illustrated in FIG. 3, mortgage loans are included in the loss list when there is a risk of a loss, such as is indicated by a delinquent mortgage loan, and hence a risk of a loss to the investor. The system 100 includes the database 118 where mortgage loan information is stored. The mortgage loan information preferably includes various parameters representative of the mortgage loan status including a delinquency history for the mortgage loan. The delinquency history, in one example, is represented by a string of codes that reflect the status of each month's payment on the mortgage loan. For example, if a single month's payment is missed, then a "3" will be in the delinquency history for the missed month indicating thirty days of delinquency, and if a second month's payment is missed, then a "6" will be in the delinquency history for the second missed month indicating sixty days of delinquency. All of the delinquency history codes are described in more detail below.

In one embodiment, all mortgage loans in a particular pool or a combination of selected pools or all pools are analyzed to determine which mortgage loans should be included in the loss list and each mortgage loan potentially in loss is flagged in the database 118. In one example, the loss list does not include every delinquent mortgage loan in the analyzed pool. Rather, only a subset of the delinquent mortgage loans is included in the loss list, which focuses the loss list on only those mortgage loans where it is considered more likely that the mortgagor will be unable to make payments on the mortgage loan to cure the default and eventually will result in a loss or where it is more likely that, if the mortgage loan is not paid, a loss will result.

Referring to FIG. 3, the loss list engine is connected with the database 118 or otherwise provided access to a set of mortgage loan data, such as a pool (operation 302). Referring to FIG. 4, a table illustrating some of the parameters included with the mortgage loan data stored in the database 118 is shown. The mortgage loan data has numerous parameters relating to the mortgage loans, including: a mortgage loan number illustrated in a "Loan Number" column of the table for identifying the mortgage loan (e.g., 0000091700); a first payment date for the mortgage loan illustrated in a "First Payment Date" column of the table (e.g., Jan. 1, 1998), which represents the first date that a payment was due on the mortgage loan after it was closed; and a state illustrated in a "State" column and a zip code illustrated in a "Zip" column (e.g., Colorado 80465), which represents the location of the property relating to the mortgage loan.

As mentioned above, the mortgage loan data includes a delinquency history for the mortgage loan illustrated in a "Delinquency History" column of the table. A "C" code indicates that the mortgage loan is current, and accordingly that the appropriate payments have been made. A mortgage loan that is 30 days delinquent (code "3") indicates that a single payment against the mortgage loan has not been made in a timely manner. A mortgage loan that is 60 days (code "6") delinquent indicates that two consecutive payments on the mortgage loan have not been made in a timely manner. A mortgage loan that is 90 days delinquent (code "9") indicates that three consecutive payments or more on the mortgage loan have not been paid in a timely manner A mortgage loan in foreclosure (code "F") indicates that foreclosure proceedings have started. A mortgage loan that is real estate owned ("REO," code "R") has been foreclosed and the servicer has taken title to the property from the mortgagor.

An example delinquency history string illustrated in row 1 of the table is C36F999FFFFRRO. In the first month the mortgage loan payments were current as indicated by the "C" in the first position of the delinquency history string. In the second month, a payment was missed making the mortgage loan 30 days delinquent as indicated by the "3" in the second position of the delinquency history string. In the third month, an additional payment was missed making the mortgage loan 60 days delinquent as indicated by the "6." In the fourth month, foreclosure proceedings began on the mortgage loan as indicated by the "F." However, in the fifth month, the delinquency history string shows a "9" indicating 90 days delinquent, which might indicate that a check was received, and the servicer temporarily discontinued foreclosure proceedings against the mortgagor. The mortgage loan remained 90 days delinquent for months six and seven as indicated by the "9" in the sixth and seventh position of the delinquency history string, which might indicate that the mortgagor continued to make monthly payments, but did not pay the delinquent payments (which would be indicated with a "C"). In the eighth month, foreclosure proceedings were started again as indicated by the "F" in the eighth position of the delinquency history string, perhaps because another payment was missed. Foreclosure continued through the eleventh month as indicated by the "F" in the ninth through eleventh positions of the delinquency history string. In month twelve, title was obtained, and that property became REO as indicated by the "R" in the twelfth position. In month fifteen, the status became a null value, indicating the property was sold. A liquidated mortgage loan is indicated with an "O."

Referring again to FIG. 3, all mortgage loans that are currently on a watch list are added to the loss list (operation 304). The watch list is preferably a subset of the loss list that is generated using the risk-filtering engine 108. The generation of the watch list and the risk filters are discussed in more detail below.

After updating the loss list to include loans from the watch list, it is determined whether the mortgage loan is 30 days delinquent, 60 days delinquent, 90 days delinquent, in foreclosure, or REO ("3-6-9-F-R") (operation 306). If the mortgage loan is not 3-6-9-F-R, then the mortgage loan is not included in the loss list (operation 308). This generally indicates that the mortgage loan is current, and accordingly all payments on the mortgage loan are up to date.

If the mortgage loan is 3-6-9-F-R, then the mortgage loan is further analyzed to determine if the balance of the mortgage loan exceeds a threshold amount (operation 310). The threshold amount is programmable, and preferably set at a different amount according to the characteristics of a pool. Generally, a high balance mortgage loan may result in a large loss if the mortgage loan is foreclosed on, and accordingly represents a higher risk than a mortgage loan of lesser amount. The threshold amount is the amount in each pool above which any mortgage loan would pose a risk of loss if it defaulted, regardless of its other characteristics. Accordingly, all mortgage loans exceeding the threshold amount that are 3-6-9-F-R are included in the loss list (operation 312).

An exemplary threshold amount is $275,000. A mortgage loan pool might be made up primarily of mortgage loans with an average balance of $250,000, with a few mortgage loans with balances in excess of $250,000. In this exemplary mortgage loan pool, mortgage loans with balances more than a few standard deviations away from the average balance of $250,000 pose a greater risk of loss than those mortgage loans whose balances are approximately $250,000. The threshold amount of $275,000 will indicate those loans that pose a greater loss by a meaningful amount (i.e., by more than a few standard deviations from the average mortgage loan balance in the pool) than the mortgage loans in the pool whose balances are approximately at or below the average. Next, all mortgage loans with a balance less than the threshold amount are analyzed to identify subprime mortgage loans (operation 314). Generally, subprime mortgage loans include any mortgage loans that are given to applicants with a flawed credit history, such as a bankruptcy filing or a history of delinquencies. Subprime mortgage loans are oftentimes considered a higher risk than prime mortgage loans, which are given to applicants without a flawed credit history. Accordingly, all subprime mortgage loans that are 3-6-9-F-R are included in the loss list (operation 312).

All prime or alternative credit mortgage loans are analyzed to identify whether the mortgage loan is 60 days delinquent, 90 days delinquent, in foreclosure, or REO ("6-9-F-R") (operation 316). Prime or alternative credit mortgage loans that are 6-9-F-R are included in the loss list (operation 312). In the method as illustrated in FIG. 3, mortgage loans that are only 30 days delinquent and not high risk, e.g., less than the threshold amount and not on the watch list the prior month are not included in the loss list (operation 318). This focuses the loss list on the more risky mortgage loans, and does not include mortgage loans where perhaps a single missed payment was simply a mistake and not indicative of the mortgagor having difficulty making payments. Non-sequential missed payments, which may pose a risk but are not captured and added to the loss list by the loss list engine in some embodiments, may be captured using the risk filters as discussed below.

II. Loss Estimate Engine

The loss estimation engine 104 includes software program code to implement a method for estimating a financial outcome or loss associated with a foreclosure on a mortgage loan. In one aspect of the present invention, a loss is estimated for each mortgage loan identified in the loss list. The estimated loss represents an estimation of the loss (or gain) resulting from a foreclosure and eventual liquidation of a mortgage loan. Losses incurred as a result of foreclosure proceedings are mostly due to foreclosure expenses including missed mortgage loan payments and fees associated with the foreclosure proceedings. After a foreclosure proceeding is completed, the party responsible for administering a mortgage loan, typically a servicer, takes ownership of the foreclosed property and sells the property. In another aspect of the present invention, the estimated losses for each mortgage loan in a pool are aggregated to obtain an estimated financial outcome (or loss) for the pool.

The loss estimate provided by the loss estimation engine 104 is useful to both investors and credit risk managers. For example, investors can more accurately assess risk by knowing the estimated loss for each mortgage loan in the loss list and an aggregate loss estimate for the pool. A pool having 30 mortgage loans in foreclosure, for example, but with an aggregate financial outcome estimate value that indicates a gain is likely if the mortgage loans are foreclosed, perhaps from property value appreciation, does not, in reality, pose a substantial risk to the investor. The fact that 30 mortgage loans were in foreclosure, however, without more information would likely have caused concern to the investor.

The credit risk manager can implement and prioritize mitigating actions, such as investigating and correcting foreclosure delays, for those mortgage loans that have the highest estimated losses and thereby oftentimes reduce the actual losses. For example, by correcting foreclosure delay, the lost interest payments associated with the delay are reduced or eliminated. The loss estimate is also used in conjunction with the probability of loss determination to project a loss reserve for a bond, which is described in more detail below.

Figure 5:
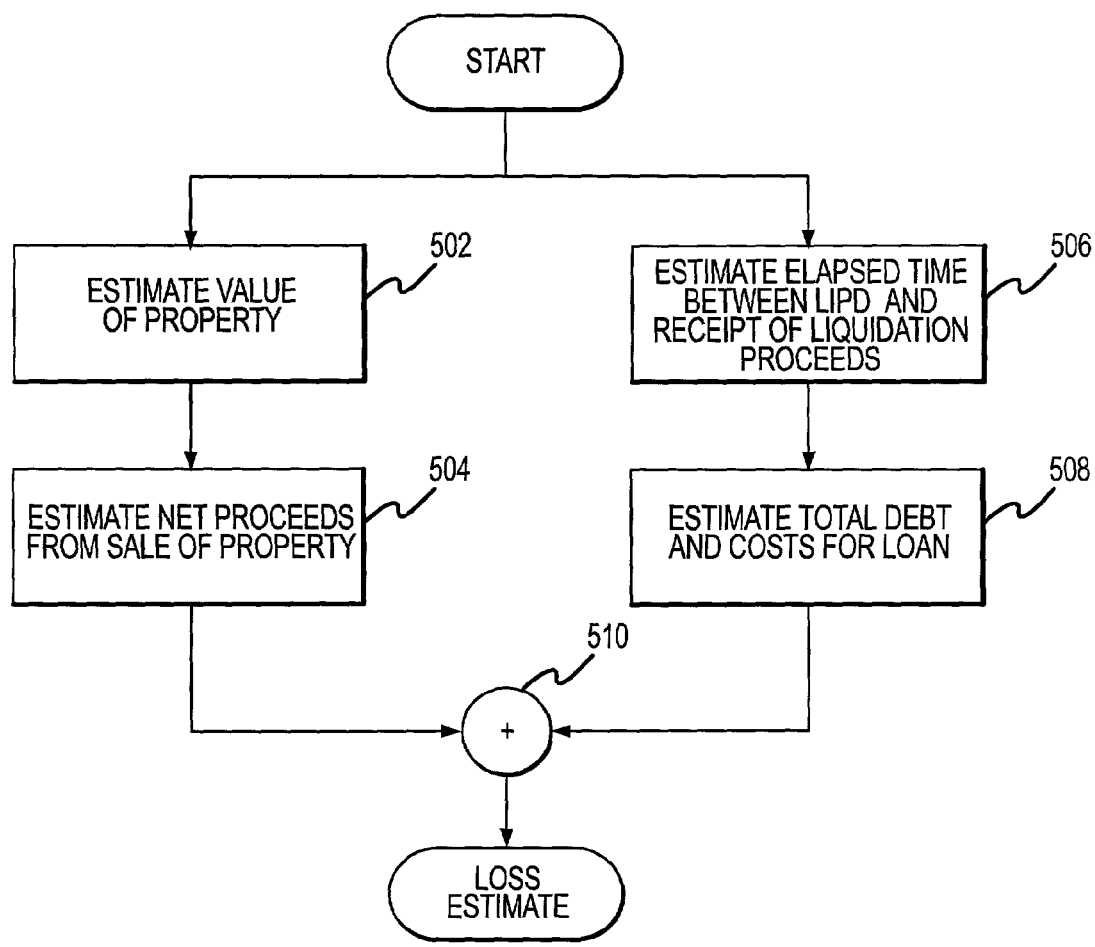
FIG. 5 is a flowchart illustrating a method for estimating a loss from a foreclosure on a mortgage loan according to one embodiment of the invention.

FIG. 5 is a flowchart illustrating a method for estimating a loss from a foreclosure on a mortgage loan according to one aspect of the present invention. The loss estimate is generally an estimate of the net proceeds from selling the property less an estimate of the total debt and costs for the mortgage loan. To estimate the net proceeds from the sale of a property associated with a mortgage loan, first the value of the property associated with a mortgage loan in the loss list is estimated (operation 502). In one example, the most accurate predictor of the sales price for the property on the open market is used to estimate the value of the property. For example, if property associated with a mortgage loan in the loss list has already been foreclosed and sold, then the actual sales price for the property is used to estimate the value of the property. Next, the net proceeds resulting from the sale of property is estimated (operation 504), which is preferably a function of the estimated value of the property and the expenses and costs related to selling the property.

To estimate the total debt and cost for the mortgage loans, first an elapsed time from a last interest paid date to the receipt of the liquidation proceeds received from the sale of the property, i.e., liquidation time ("LT"), is estimated (operation 506). The LT is important, for example, because for each payment missed by a mortgagor the investor's return on the pool is reduced by an interest payment. Next, the total debt and costs of the mortgage loan is estimated (operation 508).

In one embodiment of the invention, the total debt of the mortgage loan is a function of the LT. To estimate the loss for the mortgage loan (operation 510), the estimated total debt of the mortgage loan (from operation 508) is subtracted from the estimated net proceeds (from operation 504). For example, a loss estimate is generated for each mortgage loan in the loss list according to the method illustrated in the flowchart of FIG. 5.

FIGS. 6-11 are flowcharts illustrating various methods related to the method for estimating a loss illustrated in FIG. 5. In some of these flowcharts, specific values are set forth in a particular order according to one embodiment of the invention. It should be recognized, however, that some of the specific values may be changed and the operation presented in a different order, or eliminated entirely, without departing from the spirit and scope of the invention.

A. Estimating the Value of the Property

Figure 6:
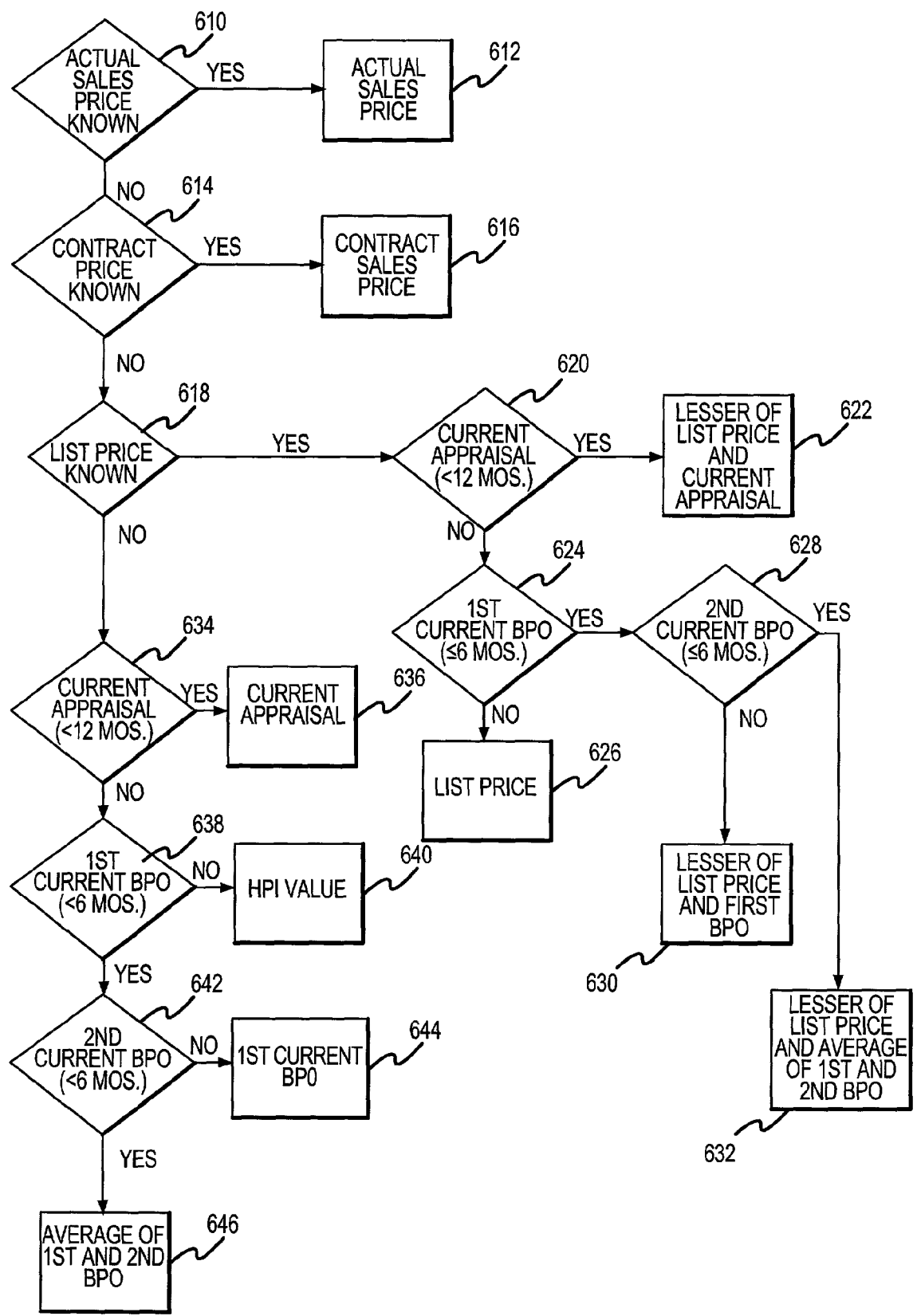
FIG. 6 is a flowchart illustrating a method for estimating a value of a property according to one embodiment of the invention.

FIG. 6 is a flowchart illustrating a method for estimating the value of a property according to one aspect of the present invention. This method is useful, in part, in estimating the value of a property (operation 502) in conjunction with determining the loss estimate. The ultimate value of the property and the most accurate predictor of the price for the property on the open market is the actual sales price for the property, which in some instances will be known. Accordingly, the estimation of the value of the property begins with determining if the actual sales price for the property related to the mortgage loan is known (operation 610). If the actual sales price is known, then the estimated value of the property is set as the actual sales price for the property (operation 612).

Following the actual sales price for the property, the next most accurate predictor of the value of the property is considered to be the contract price for the property. Until the contract closes and the sale is complete, the actual sales price for the property is unknown. This is because the contract may fall through and not close, for instance because an appraisal on the property comes in at a lower value than the contract price, or because an inspection may turn up problems with the property that will lower the price, or because the contract may be broken for other reasons such as the buyer's failure to obtain a loan to purchase the property. Accordingly, if the actual sales price is not available, it is determined whether there is a contract on the property, and what the contract price is (operation 614). If the contract price for the property related to the mortgage loan is known, then the contract price is set as the estimated value of the property (operation 616).

After the contract price, the next most accurate predictors of the value of the property are considered to be the list price for the property, the current appraisal, or one or more current Broker Price Opinions ("BPO"). First, it is determined whether the list price is known (operation 618). If the list price is known, then it is determined whether there is a current appraisal for the property (operation 620). An appraisal is considered "current" if the appraisal was performed less than 12 months before the value of the property is being estimated. A current appraisal, however, may be established as less than 12 months or greater than 12 months to more accurately reflect market conditions in the area of the property. For example, in a rapidly growing market an appraisal that was performed within six months may be required to account for market conditions, whereas in a stagnant market an appraisal that was performed within 18 months may be adequate to account for market conditions. If there is a current appraisal and the list price is known, then the lesser of the list price and the current appraisal is set as the estimated value of the property (operation 622). Realtors often list a property for slightly more than they expect to actually receive for the property to provide price flexibility during negotiations with potential buyers. Accordingly, the lesser of the list price and the appraisal is considered to more accurately reflect the value of the property.

If there is no current appraisal, then the list price is compared with any current BPOs for the property. Accordingly, it is determined whether there is a current BPO for the property (operation 624). The BPO is an opinion of the value of the property by a real estate broker, and is considered "current" if it was performed less than six months before the value of the property is being estimated. A "current" broker price opinion may be established as less than or more than six months to more accurately reflect market conditions. Generally, the accuracy of the BPO depends to some extent on the level of familiarity that a real estate broker has with the specific area that a property is located in. Accordingly, the accuracy of the BPO may vary depending on the broker that performs the BPO. If there is a current BPO, then it is determined whether there is a second current BPO (operation 628). If there is a second current BPO, then the lesser of the list price and the average of the first and second current BPO is set as the estimated value of the property (operation 632). BPOs are based on opinion and are not substantiated by actual interior property inspections; accordingly, BPOs in some cases vary widely between brokers. An average is taken between the first and second current BPO to account for any discrepancy between them.

If there is not a second current BPO, then the lesser of the list price and the first current BPO is set as the estimated value of the property (operation 630). The lesser of the list price and the first BPO (or average BPO) value accounts for the situation when realtors list at a higher price than they plan to obtain. Finally, if there is not a current BPO and there is not a current appraisal, then the list price for the property is set as the estimated value of the property (operation 626).

Following the list price alone or in combination with an appraisal or a BPO, the next most accurate estimation of the value of the property is considered to be a current appraisal for the property because the listing agent is considered to more accurately understand the value of the property as compared with one appraiser, who might have visited the property 12 months ago. Accordingly, it is determined whether there is a current appraisal for the property (operation 634). As mentioned above, the appraisal is considered current if it was obtained less than 12 months before the valuation of the property. If there is a current appraisal, then it is set as the estimated value of the property (operation 636).

After the current appraisal for the property, the next most accurate predictor of the value of the property is considered to be any current BPOs. An appraisal of the property generally includes a formal comparison of the sales price for similar properties in an area and a thorough interior and exterior property inspection, and is accordingly considered more accurate than a BPO, which does not include the same formality or investigation. If there is not a current appraisal, then it is determined whether there is a current BPO (operation 638). As mentioned above, the BPO is considered current if it was performed less than six months before the date the value is being estimated.

If there is not a current BPO, then a value derived from a Housing Price Index ("HPI") is set as the estimated value of the property (operation 640). The HPI, in one example, is the value of the property determined using Freddie Mac statistics, which estimates the value of the property by applying a percentage increase to the original value of the property based on location. Freddie Mac statistics are published quarterly. They show a rate of increase or decrease in property values for a given zip code since the end of the preceding quarter. The value of a property is computed by increasing or decreasing its volume from the time it was originated by the cumulative increase or decrease in volume reported by Freddie Mac since the time of its origination. The Freddie Mac statistics are kept in a table, known in the art, of the most recently published quarterly HPI statistics. If there is a current BPO, then it is determined whether there is a second current BPO (operation 642). If there is not a second current BPO, then the first current BPO is set as the estimated value of the property (operation 644). If there is a second current BPO, then the average of the first current BPO and the second current BPO is set as the estimated value of the property (operation 646).

The estimated value of the property is used to estimate the net proceeds from sale of the property which is described in more detail below with regard to FIG. 8. The estimated net proceeds from the sale of the property is used to estimate the loss on the property, should it proceed through foreclosure and be sold. Estimated loss on a property is also used by a credit risk manager to evaluate alternative strategies for mitigating the loss on the mortgage loan. For instance, the property could be taken through foreclosure and sold, or it might be determined that a more favorable outcome would result from extending payment terms to the mortgagor so that foreclosure and the costs and risks associated with it are avoided.

B. Estimating the Liquidation Timing

Figure 7:
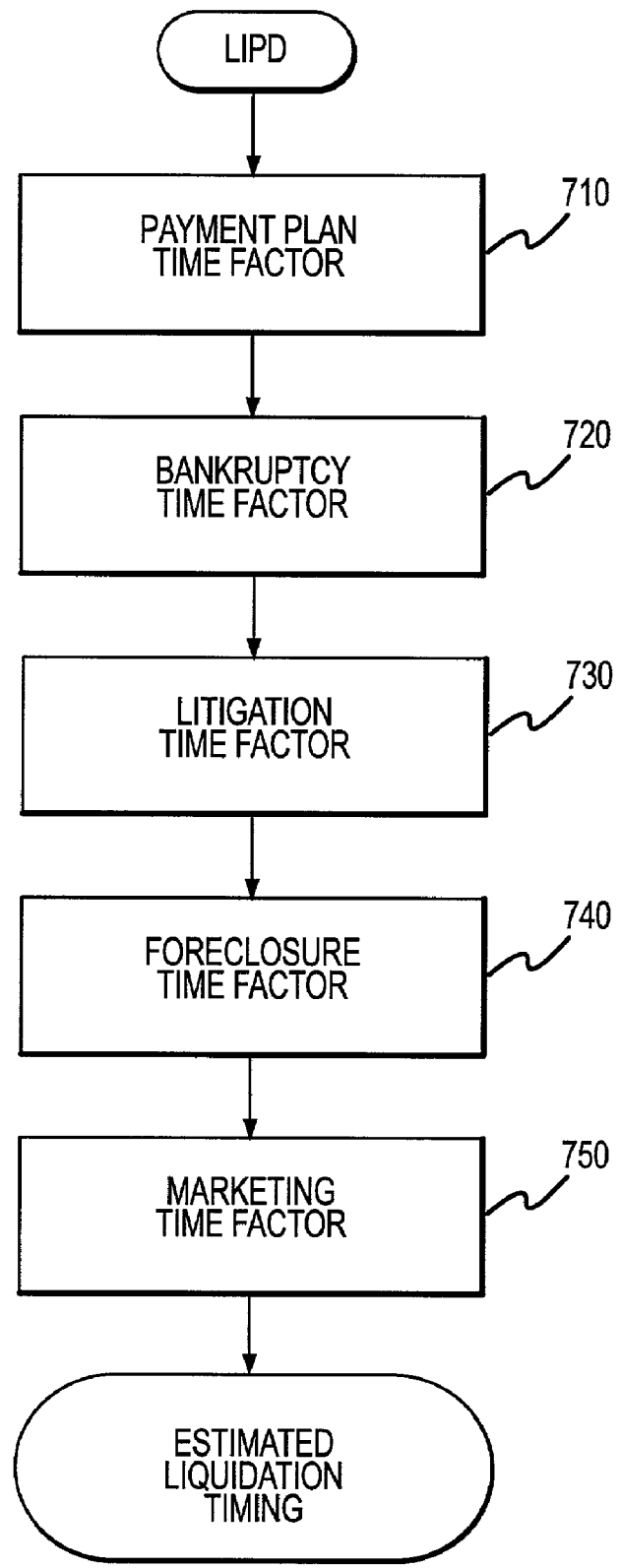
FIG. 7 is a flowchart illustrating a first method for estimating liquidation timing for a mortgage loan foreclosure according to one embodiment of the invention.

FIG. 7 is a flowchart illustrating a first method for estimating the liquidation timing (LT), which, in one example, is the elapsed time between the last payment made on the mortgage loan and the receipt of the liquidation proceeds from the sale of the property after foreclosure. The LT is used to estimate the total debt of the mortgage loan as discussed in more detail below with regard to FIG. 10. The LT is also used by a credit risk manager to identify mortgage loans that are predicted to proceed through foreclosure and liquidation in a time period that exceeds the normal time period for a similar loan. An LT that indicates a much longer time period from last interest paid date through liquidation and receipt of proceeds might suggest a problem, such as pending litigation or lost mortgage loan documents, that could be resolved if appropriate corrective action is taken. An excessively long timeline could also indicate to the credit risk manager or the investor that a geographic area is showing signs of distress if, for instance, several mortgage loans from the same geographic area show a sudden increase in LT. Another way that LT can be used is to identify a servicer that is not processing foreclosures according to the expected timeline. An LT that exceeds the timeline that is expected according to the servicer's stated policies also indicates that the servicer is not adhering to the policies that it has represented to be in place.

The LT determination begins with the last interest paid date ("LIPD"), which is the last date that a payment was received on the mortgage loan, e.g., a hypothetical LT might begin with an LIPD of Jan. 1, 2001. Next, one or more time factors are added to the LIPD to estimate the LT. First, a first time factor to account for a payment plan is added to the LT ($TF_{payplan}$) (operation 710). Oftentimes, if a mortgagor is in trouble, the servicer may put the mortgagor on a payment plan, which is intended to give the mortgagor extra time to catch up on delinquent payments. The first time factor, in one example, is the amount of time that the payment plan provides for the mortgagor to catch up on delinquent payments. For example, a servicer may give a mortgagor three months to catch up on payments, which would be added to the LIPD and would change the hypothetical LT to Apr. 1, 2001 (Jan. 1, 2001+3 mo.).

Next, a second time factor to account for any bankruptcy proceeding related to the property is added to the LT ($TF_{bankruptcy}$) (operation 720). There are numerous statutory bankruptcy proceedings, such as chapter 11 or chapter 13, under the U.S. Bankruptcy Code, which typically take some amount of time to complete. The second time factor, in one example, is an estimate of the amount of time to account for the bankruptcy chapter the mortgagor is in. For example, a chapter 13 bankruptcy proceeding may take an average of three months; accordingly, the second time factor for a chapter 13 bankruptcy proceeding is preferably three months. Referring to the hypothetical LT, the LT adjusted to account for chapter 13 bankruptcy proceedings is Apr. 1, 2001+3 months=Jul. 1, 2001.

Next, a third time factor to account for litigation is added to the LT ($TF_{litigation}$) (operation 730). The third time factor is set to 12 months, in one example, if there is litigation relating to the mortgage loan. A mortgagor might initiate litigation if payments are disputed, such as when the mortgagor claims to have sent payments but the servicer has no record of receiving them. A mortgagor might also contest the servicer's legal right to foreclose. In any case, litigation is typically time consuming because of court backlogs, the ease with which a mortgagor can delay scheduled hearings, and a generally mortgagor-friendly U.S. court system. Twelve months is the amount of time that is typically experienced as a delay, regardless of the nature of the litigation. If there is no litigation, then the third time factor is set to zero. Referring to the hypothetical LT, the LT adjusted to account for litigation is Jul. 1, 2001+12 months=Jul. 1, 2002.

Next, a fourth time factor to account for foreclosure proceedings is added to the LT ($TF_{foreclosure}$) (operation 740). The fourth time factor, in one example, is a function of the start date of the foreclosure proceedings and any state-specific foreclosure timing and other foreclosure issues (e.g., redemption periods). To account for state specific foreclosure timing and other issues, reference is made to a table, known in the art, of published expected foreclosure times by state. Referring to the hypothetical LT, a mortgage loan in New Jersey is expected to take 12 months to foreclose, resulting in an adjusted hypothetical LT of Jul. 1, 2002+12 months=Jul. 1, 2003.

After the conclusion of the foreclosure proceedings, in one example, a fifth time factor to account for a marketing period to sell the property is added to the LT ($TF_{REOmarketing}$) (operation 750). Marketing a property depends on a number of factors including the type of property, the strength or weakness of the real estate market, the value and condition of the property, and whether any eviction from the property is required. The fifth time factor takes these and other factors into account. For example, if the property will require extensive repair work to facilitate the sale of the property, but no eviction from the property is required, then six months is added to the LT. Referring to the hypothetical, the LT adjusted to account for marketing the property is Jul. 1, 2003+6 months=Jan. 1, 2004.

The various events related to the time factors discussed above generally occur serially, i.e., one does not begin until the other concludes. Therefore, in one implementation of the method of FIG. 7, the LT is adjusted by adding each time factor to the LT. For example, foreclosure proceedings are generally delayed until the conclusion of litigation. It can be seen from the hypothetical litigation timing estimation that months and even years of payments may be missed during all of the various possible proceedings before the liquidation of the property, which account for tremendous losses to the pool. The present invention accounts for the liquidation time in generating the loss estimate as illustrated in FIG. 5 and elsewhere. Moreover, by identifying troublesome loans in the portfolio with the loss estimate, probability of loss, and risk filters, the liquidation timing may be shortened considerably by implementing various loss mitigation activities and focusing those mitigation activities on the troublesome loans.

Figure 8:
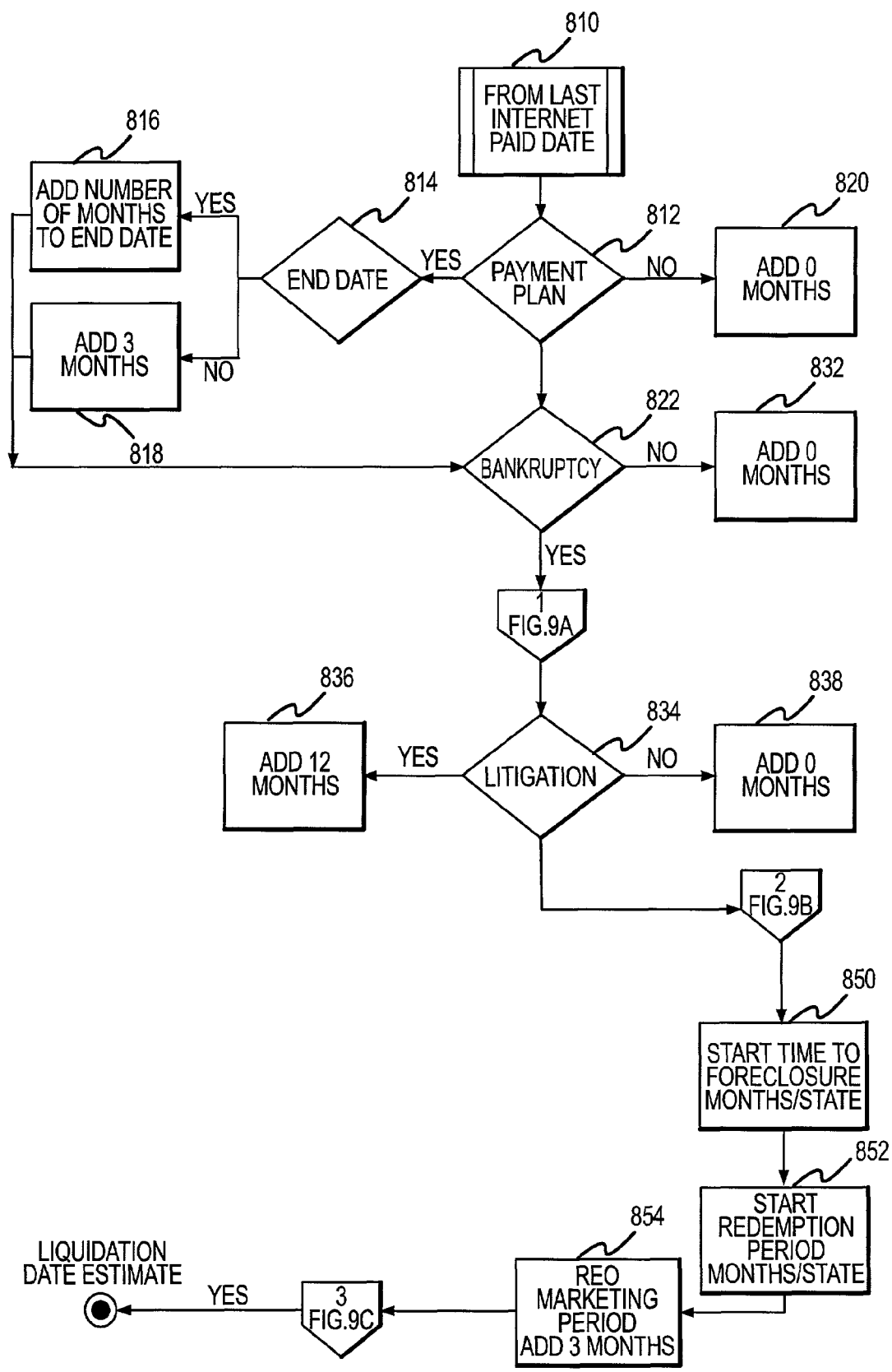
FIG. 8 is a flowchart illustrating a second method for estimating liquidation timing for a mortgage loan foreclosure according to one embodiment of the invention.

FIG. 8 is a flowchart illustrating a second method for estimating the LT according to one aspect of the present invention. The LT determination begins with the LIPD date (operation 810). Operations 812-820 illustrate an aspect of the method for projecting the first time factor to account for a payment plan, i.e., $TF_{payplan}$. First, it is determined whether the mortgagor is on a payment plan (operation 812). The credit risk manager may be told of a payment plan by the servicer and thereafter manually enter the payment plan details in the system, or the mortgage loan data 110 provided by the servicer may have a payment plan flag indicating that a payment plan is in place. If there is a payment plan, then the end date of the payment plan is determined (operation 814). Next, the time between the LIPD and the end date is added to the LT (operation 816). If the end date for the payment plan is unknown, then three months, in one example, is added to the LT (operation 818), which is the typical amount of time allotted for payment plans. If there is no payment plan, then no time is added to the LT (operation 820).

Figure 9A:
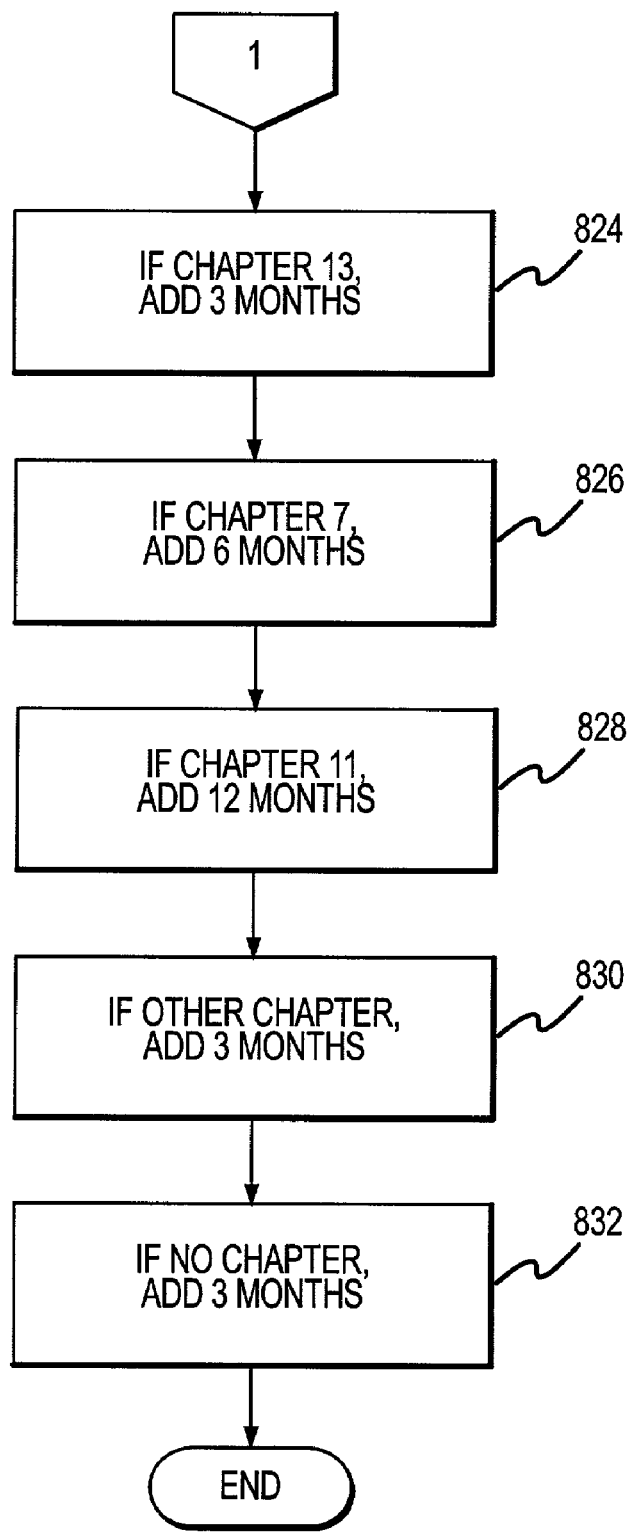
FIG. 9A is a flowchart illustrating a method for estimating a time factor to account for bankruptcy proceedings that is useful in the liquidation timing estimation methods illustrated in FIG. 7 and FIG. 8.

After the first time factor determination, it is determined whether there is a bankruptcy proceeding related to the property (operation 822). The credit risk manager may be told of a bankruptcy by the servicer, or a code on the mortgage loan's data record 110 may indicate a bankruptcy. FIG. 9a is a flowchart illustrating a method for determining the second time factor to account for bankruptcy proceedings, i.e., $TF_{bankruptcy}$. Three months are added to the LT if the mortgagor is in chapter 13 bankruptcy (operation 824). Six months are added to the LT if the mortgagor is in chapter 7 bankruptcy (operation 826). Twelve months are added to the LT if the mortgagor is in chapter 11 bankruptcy (operation 828). Three months are added to the LT if the mortgagor is in any other type of bankruptcy proceedings or if the bankruptcy chapter is unknown (operation 830). These particular bankruptcy time factors can be changed whenever necessary. In one embodiment, the start of the bankruptcy proceeding is taken into account. Accordingly, the bankruptcy start date is either added to the bankruptcy timing (if the bankruptcy proceedings are scheduled to start in the future) or the start date is subtracted from the bankruptcy timing (if the bankruptcy proceedings have already begun). Referring again to FIG. 8, if there are no bankruptcy proceedings, then no time is added to the LT (operation 832).

Operations 834-838 an aspect of the method for projecting the third time factor to account for litigation, i.e., $TF_{litigation}$. In operation 834, it is determined whether there is litigation related to the property. If there is litigation involving the property, then 12 months is added to the LT (operation 836). If there is no litigation involving the property, then no time is added to the LT (operation 838).

Operations 840-852 illustrate an aspect of the method for projecting the fourth time factor to account for foreclosure proceedings, i.e., $TF_{foreclosure}$. For purposes of determining the LT, it is preferably assumed that foreclosure will occur. In one example, the fourth time factor to account for foreclosure proceedings includes the time from the start of foreclosure proceedings until the conclusion of foreclosure proceedings.

Figure 9B:
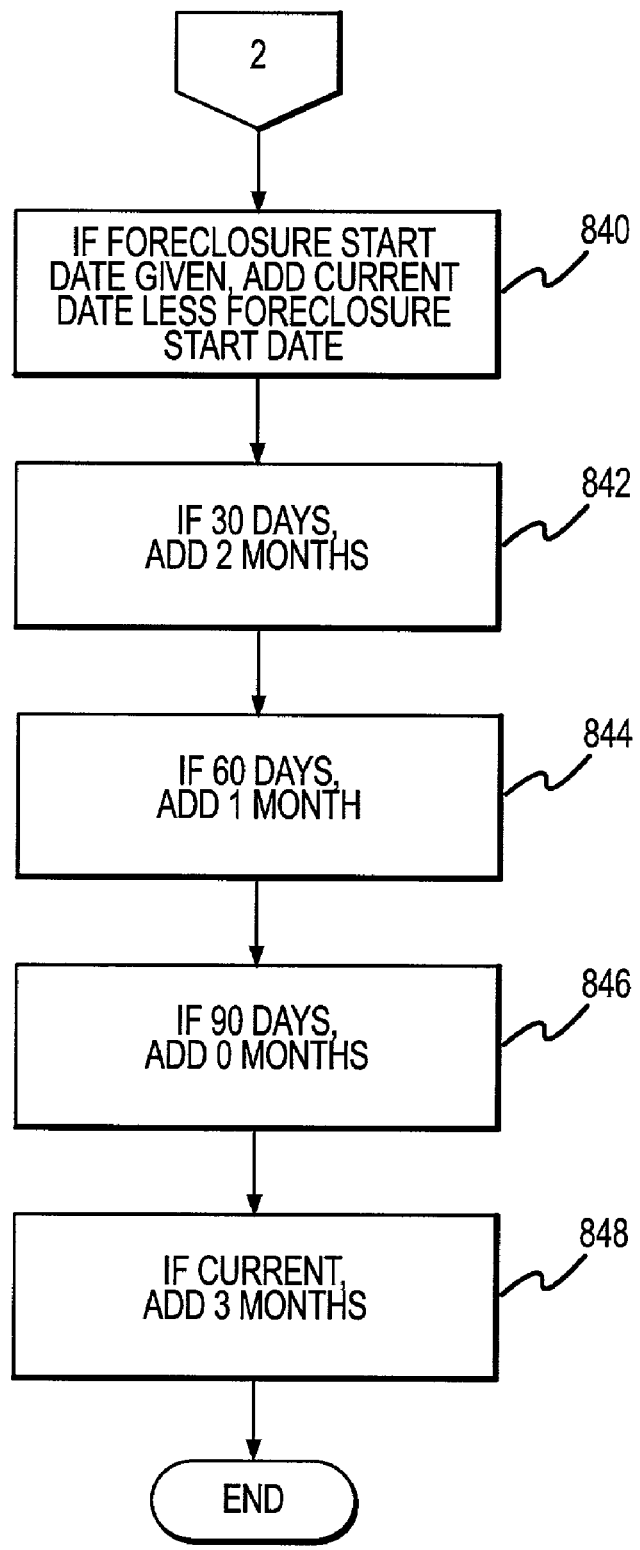
FIG. 9B is a flowchart illustrating a method for estimating a time factor to account for foreclosure proceedings that is useful in the liquidation timing estimation methods illustrated in FIG. 7 and FIG. 8.

The projection of the fourth time factor begins with determining the start date for foreclosure proceedings. FIG. 9b illustrates a method for projecting the start date for foreclosure proceedings. If the start date of the foreclosure proceeding is known and the foreclosure proceedings have already begun, then the foreclosure start date is subtracted from the current date to determine the foreclosure start date (operation 840). If a foreclosure start date is not given and the mortgage loan is 30 days delinquent, then two months are added to the LT (operation 842). Two months are added to the LT to reflect the fact that it would be at least two months from the current date before foreclosure proceedings would begin when the mortgagor is 30 days delinquent, which is based on the most common industry practice and legal restrictions which generally require 90 days of delinquency before foreclosure is filed. If the mortgagor is 60 days delinquent, then one month is added to the LT (operation 844). If the mortgagor is 90 days delinquent, then preferably no time is added to the LT (operation 846). If the mortgagor is current on his or her payment, then three months is added to the LT (operation 848).

Referring again to FIG. 8, in operation 850, the state specific foreclosure timing is accounted for in the fourth time factor. The total time for foreclosure proceedings is generally state specific. Accordingly, the state specific foreclosure timing is that of the state in which the property is located. For example, 12 months for foreclosure timing is added to the LT for a property in New York State. A time factor to account for state redemption periods is also accounted for in the fourth time factor (operation 852). Generally, the state redemption period is the time period after foreclosure proceedings in which the property owner may make all back payments and reinstate the mortgage loan, avoiding loss of the property through foreclosure. The redemption period is also state specific, and accordingly the time factor for the redemption period is added to the LT according to which state the property is located in. The summation of the start date for foreclosure proceedings, the state specific foreclosure timing, and the state specific redemption period timing comprise the fourth time factor.

Figure 9C:
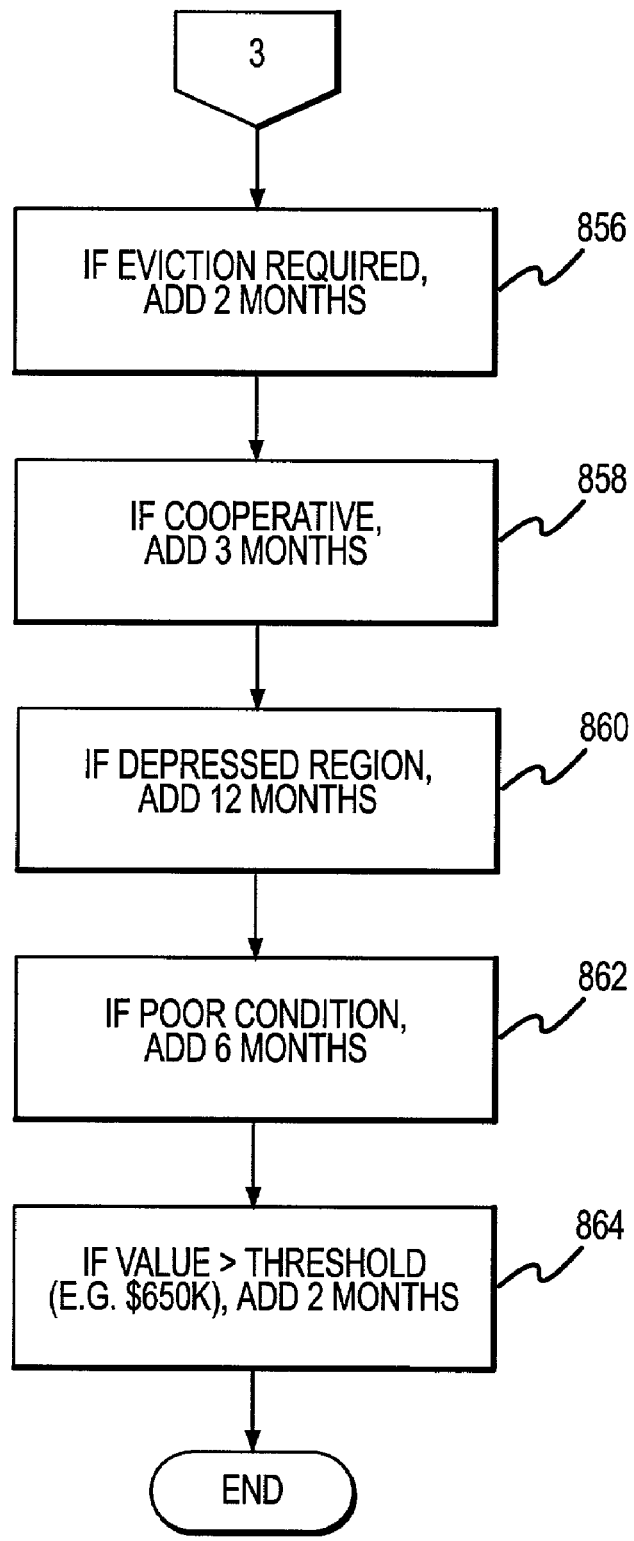
FIG. 9C is a flowchart illustrating a method for estimating a time factor to account for marketing a real estate owned property that is useful in the liquidation timing estimation methods illustrated in FIG. 7 and FIG. 8.

Operations 854-864 illustrate one aspect of the method for projecting the fifth time factor to account for the REO marketing period, i.e., $TF_{REOMarketing}$. After all foreclosure proceedings are complete, i.e., when the servicer has title to the property, three months are added to the LT to account for the average time to sell a property after foreclosure proceedings are completed (operation 854). The REO marketing period refers to the time it takes to sell a property after foreclosure proceedings are completed. Referring to FIG. 9c, a flowchart illustrating a method for determining additional REO marketing time factors is shown. Two months are added to the LT if an eviction from the property will be required (operation 856). The time it takes to evict someone from a property is highly variable, and two months is generally the average time required. Three months are added to the LT if the property is a co-op (operation 858). Generally, co-ops are one of the most difficult properties to sell because an owners association likely has to approve the buyer.

Twelve months are added to the LT for a depressed or distressed geographic region (operation 860), which is any real estate market that has experienced a catastrophic event such as an earthquake, has lost a major employer or military base, or has emerged as an area targeted by fraud rings. Depressed regions may be identified anecdotally, identified using HPI or various other publications that provide regional real estate statistics such as those published by research institutions, which are well known in the art. Six months are added to the LT for a property that is in poor condition (operation 862). Generally, a home needing serious repairs, such as a new roof, is considered to be in poor condition. In some circumstances, the correction of the condition may be a requirement for the sale of the property, which may significantly delay the sale of the property. In other circumstances, the property may be sold as is, which may also delay the sale of the property since it will have less buyer appeal. Finally, two months are added for properties with a value of $650,000 or more (operation 864). Generally, higher value properties take longer to sell than lesser-valued properties. The $650,000 value may be changed as necessary to reflect changing market conditions, to reflect the type of properties in a given pool, or to reflect other conditions.

The estimation of the elapsed time from the LIPD to the receipt of the liquidation proceeds for the mortgage loan is determined by a summation of the various time factors discussed above. In one example, the LT is a summation of time factors to account for a payment plan, a bankruptcy proceeding, a litigation, a foreclosure, and an REO marketing period (LT=LIPD+$TF_{payplan}$+$TF_{bankruptcy}$+$TF_{litigation}$+$TF_{foreclosure}$+$TF_{REOmarketing}$). The LT also provides a projected liquidation date, which is: Liquidation Date=LIPD+LT. The various time periods discussed above that are used for each time factor, e.g., three months for chapter 13 bankruptcy, are considered preferable. The time periods for each time factor, however, may be changed or manually overridden if conditions change or more particular data is received. The estimated liquidation date is an important piece of information for the investor, as it suggests when a loss will be realized (or, when the investor's yield will be reduced). The estimated liquidation date is also an important piece of information for the credit risk manager, as it may indicate a mortgage loan that is not being serviced properly, if, for instance the estimated liquidation date on a particular mortgage loan is later than the estimated liquidation date for similar mortgage loans, or if the estimated liquidation date is later than the servicer's own predicted estimated liquidation date.

C. Estimating the Net Proceeds

The estimation of the value of the property as described herein is used to estimate the net proceeds from the sale of the property. In one embodiment, the estimation of the net proceeds is determined by subtracting any sales expenses and costs associated with the sale of the property from the estimated value of the property.

Figure 10:
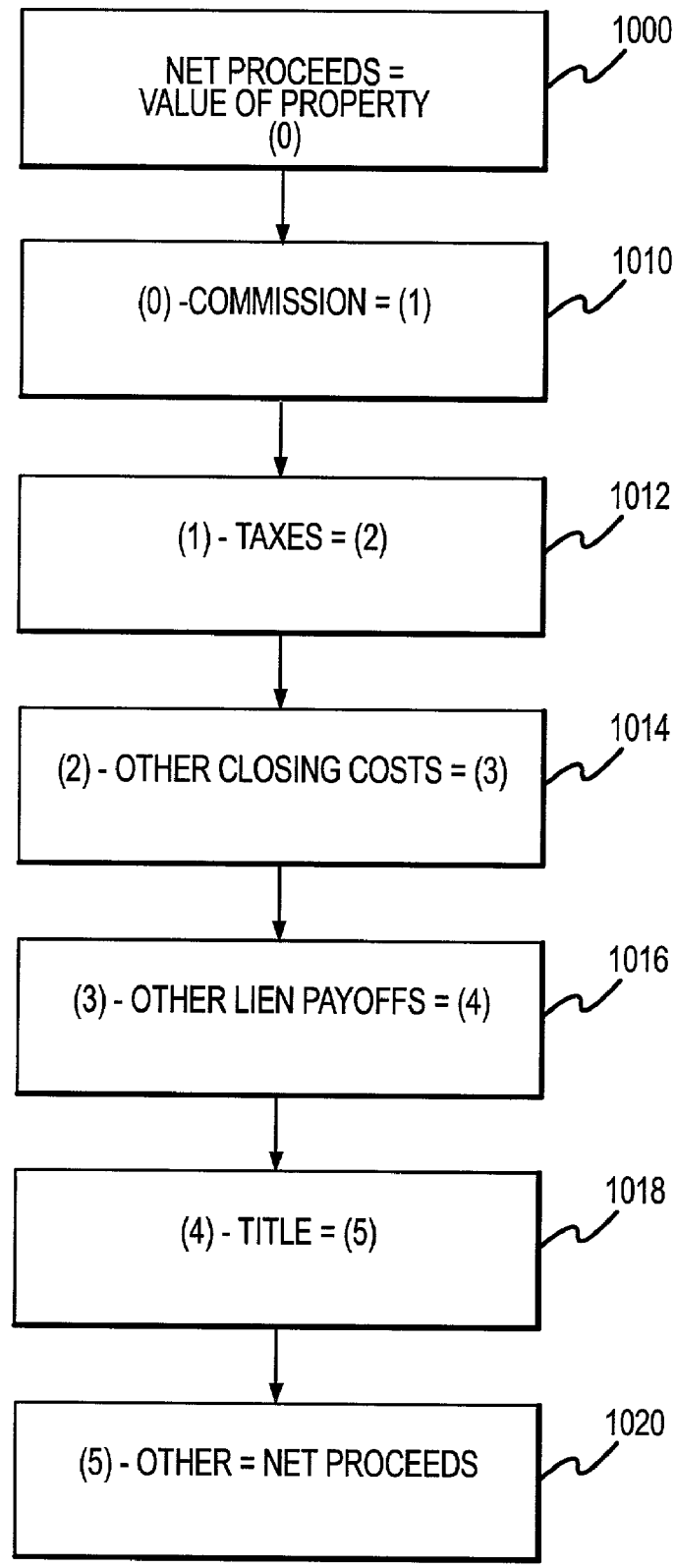
FIG. 10 is a flowchart illustrating a method for estimating net proceeds from the sale of a property according to one embodiment of the invention.

FIG. 10 is a flowchart illustrating a method for estimating the net proceeds from the sale of a property after foreclosure according to one aspect of the present invention. The net proceeds estimation begins with setting the net proceeds as the value of the property (operation 1000), which is estimated as described above with regard to FIG. 6. Next, any commissions for selling the property are subtracted from the value of the property (operation 1010). The commission is typically a percentage of the sales cost for the property that the real estate agent or agents representing the seller and buyer of the property take as a fee for the sale. A commission percentage of 6% is assumed, but may be overridden by the credit risk manager if an actual rate that differs is known.

Next, the amount of any unpaid property taxes for the property are subtracted from the amount determined in operation 1010 (operation 1020). Generally, the unpaid taxes are property taxes that the mortgagor failed to pay prior to forfeiting title of the property to the servicer through foreclosure, and that the servicer must pay in order to obtain clear title to the property. Although a servicer could sell the property once title has been obtained through foreclosure with the taxes still owing, the taxing authority retains the right to place a lien on the property and, eventually, to sell the property at auction in order to pay the owed taxes. Rather than face the risk of losing the property at auction for the amount of taxes, which are commonly just a small fraction of the value of the property, or diminish the value or liquidity of the property by marketing it with this risk attached to it, typically the servicer pays the unpaid taxes and clears the title to the property prior to marketing it for sale. Next, the closing costs for selling the property are subtracted from the value determined in operation 1012 (operation 1014). Closing costs are generally the fees and other costs for processing the sale of the property. Next, other lien payoffs are subtracted from the value determined in operation 1014 (operation 1016). Liens, such as mechanics liens, are placed on the property after the mortgage loan is obtained, and when subsequent work such as installing a patio or replacing a furnace and ductwork is done. Any liens are paid from the proceeds from the sale of the property. Next, any title fees for the property being sold are subtracted from the value determined in operation 1016 (operation 1018). Finally, any other fees or costs associated with the sale of the property are subtracted from the value determined in operation 1018 to arrive at the estimation for the net proceeds (operation 1020). For example, at a closing the seller may agree to pay the buyer for some minor repairs to the property, which would fall under the "other fees or costs."

D. Estimating the Total Debt

Figure 11:
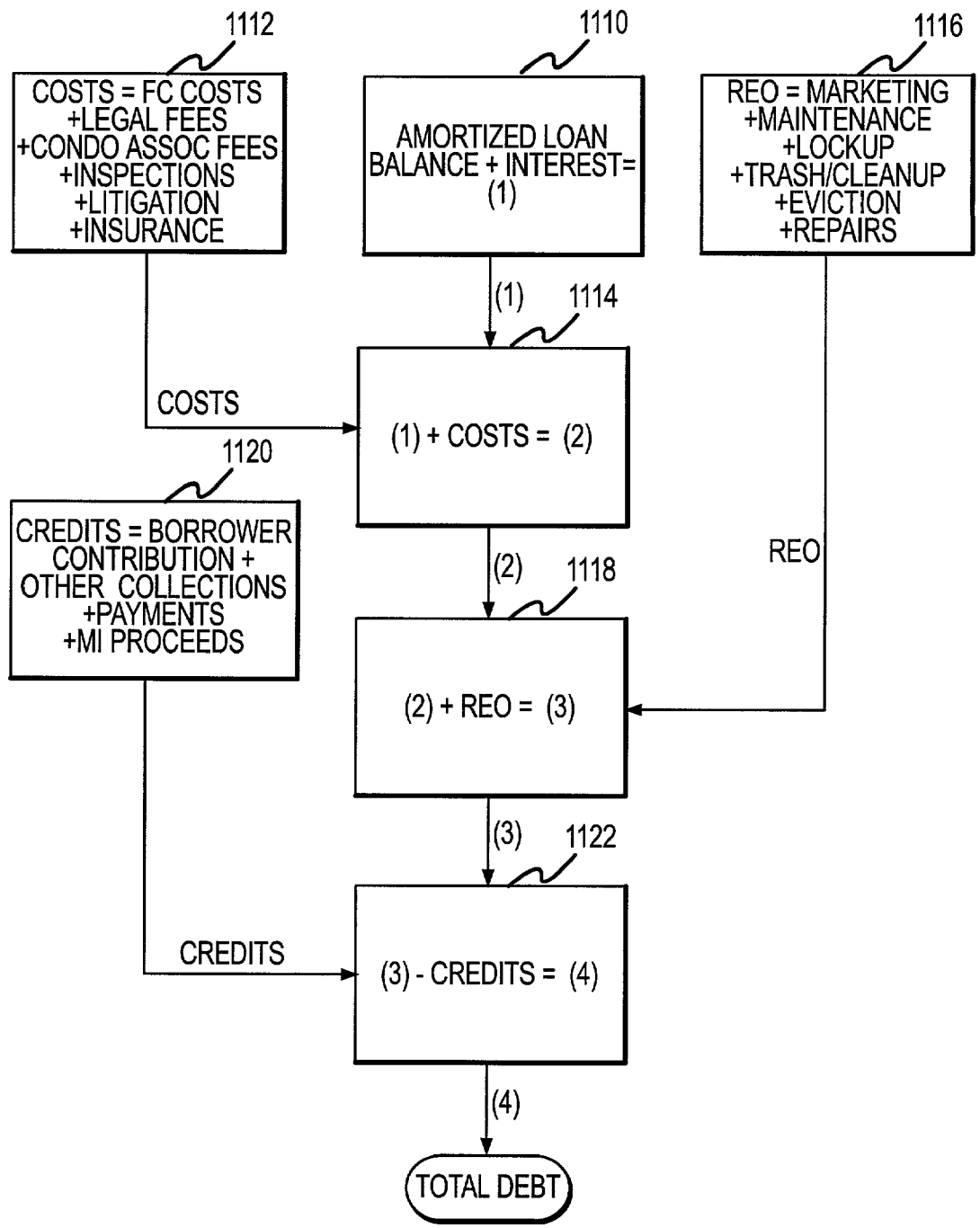
FIG. 11 is a flowchart illustrating a method for estimating the total debt for a mortgage loan according to one embodiment of the invention.

FIG. 11 is a flowchart illustrating a method for estimating the total debt for paying off the mortgage loan according to one aspect of the present invention. A total mortgage loan amount is determined by adding an amortized mortgage loan balance to the total interest advanced or accrued (operation 1110). The amortized mortgage loan balance is the balance outstanding on the mortgage loan on the date of the total debt estimation. The total interest advanced or accrued includes the interest advances since the LIPD, which is based on the LT. Generally, the interest advanced is the mortgage loan interest rate multiplied by the outstanding principle balance on the mortgage loan ("OSPB") multiplied by the LT. In operation 1112, processing costs are determined. In one example, the processing costs include any foreclosure costs, any legal fees associated with the foreclosure, any remaining condominium association fees for the property, any fees for inspections of the property, any litigation costs, and any insurance costs. The processing costs are added to the total mortgage loan amount to arrive at the mortgage loan debt amount (operation 1114).

In operation 1116, the REO cost is determined. In one example, the REO cost includes marketing costs, maintenance costs for the property, lockup costs for the property, trash or cleanup costs for the property, costs related to eviction, and repair costs for the property. The REO cost is added to the mortgage loan debt amount to arrive at a total cost (operation 1118).

In operation 1120, a credit amount is determined. In one example, the credit amount includes any borrower contributions, other collections such as rent payments, other payments, and any mortgage insurance proceeds. The credit amount is subtracted from the total cost to arrive at the total debt (operation 1122). Generally, the total debt refers to the payoff amount to liquidate the mortgage loan.

The difference between the total debt and the proceeds from the sale of the property is a gain if the proceeds exceed the total debt, or a loss if the total debt exceeds the proceeds. Referring again to FIG. 5, the estimated loss from a foreclosure on a mortgage loan according to one aspect of the present invention is the net proceeds less the total debt. Accordingly, if the net proceeds exceed the total debt, then the loss estimation will actually project a gain. Whereas, if the net proceeds are less than the total debt, then the loss estimation will project a loss. The loss estimate is useful in identifying the riskiest mortgage loans for purposes of applying loss mitigation techniques to them. It is also useful, in conjunction with the probability of loss features described later and the expected liquidation date described earlier, in assisting investors in determining loss reserves.

III. Probability of Loss

Figure 12B:
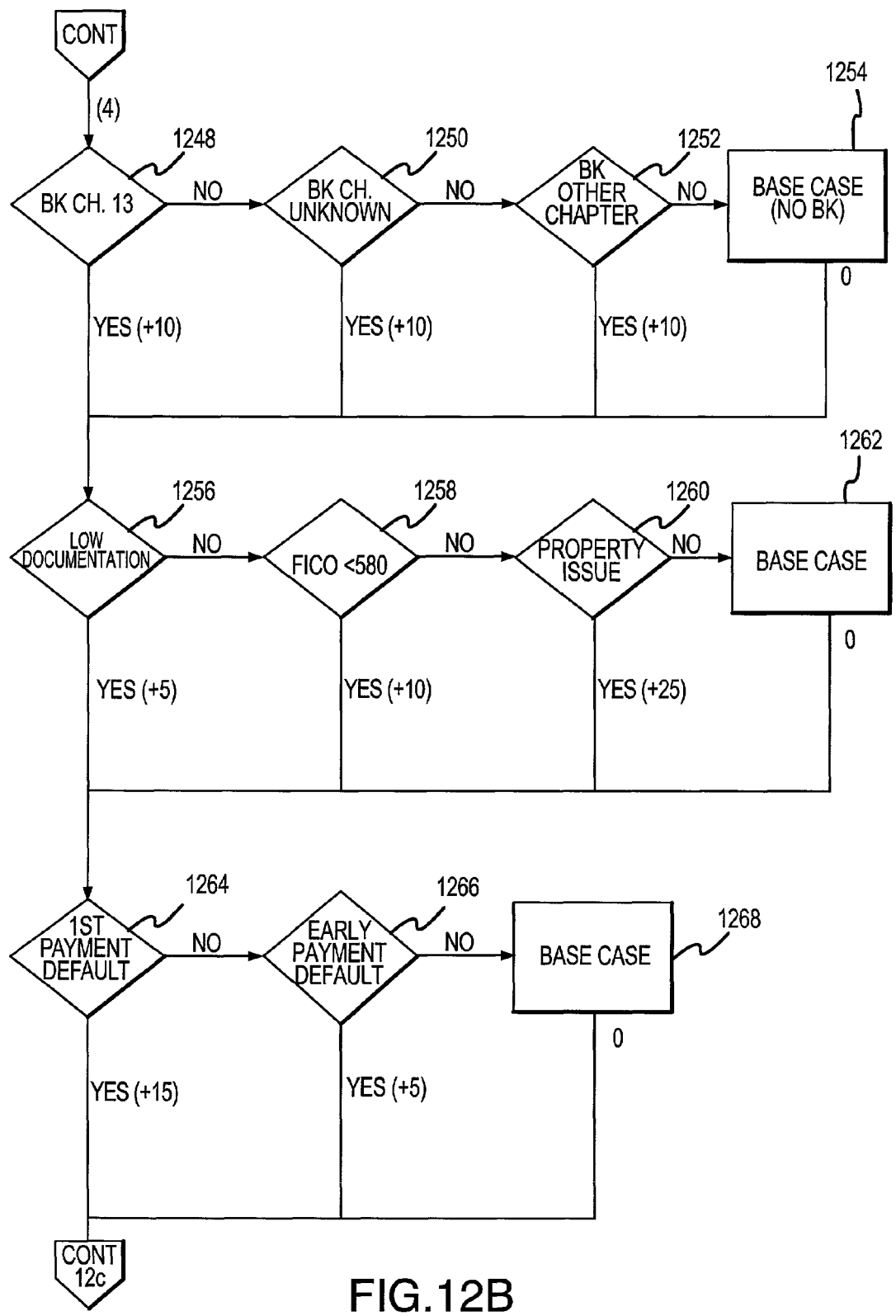
Figure 12C:
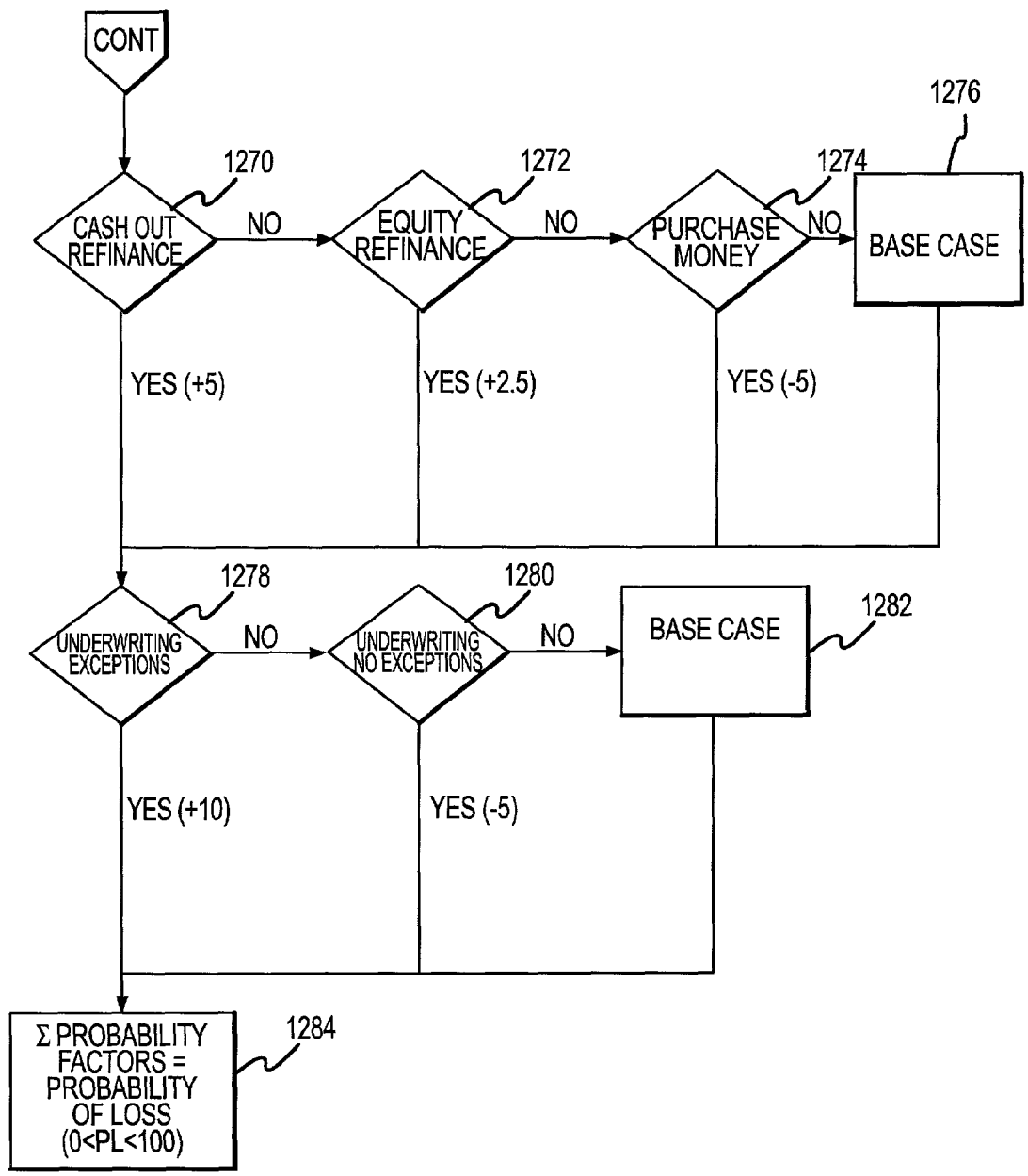

The probability of loss engine 106 includes software program code to implement a method for determining a probability of loss for a mortgage loan according to the present invention. FIGS. 12a-12c are flowcharts illustrating one method for determining a probability of loss for a mortgage loan. The flowcharts illustrated in FIGS. 12a-12c present the probability of loss determination in a particular order and with particular values. It should be recognized, however, that operations may be rearranged or even eliminated, and that the values may be changed without departing from the spirit and scope of the invention.

The probability of loss and the loss estimate are useful for investors to determine how much loss reserve to set aside for a given pool. The loss reserve is an estimate of expected losses on a pool, which must be set aside quarterly as an offset to the expected income on the pool. For example, an investor with $1 million invested in a bond, and a loss estimate of $100,000 should reserve a loss of $100,000. However, if there is less than a 100% probability that the loss is going to be realized, e.g., a 50% probability, then the entire $100,000 does not have to be reserved. Rather, only $50,000 would have to be reserved, which is advantageous for the investor because the amount recorded as a loss reserve is reported as an expense for financial accounting purposes. Recording a more accurate loss estimate, whether higher or lower than otherwise assumed, is an important objective of investors.

The investor can also use the estimated loss and probability of loss information to determine which pool the investor should retain, which pool should be sold, or which seller should be preferred over another. For example, an investor may analyze two mortgage loans from separate pools, each having an estimated loss of $100,000, for an aggregate estimated loss to the investor of $200,000. The probability of loss, however, for the first loan may be 0 and the probability of loss for the second loan may be 50%. Thus, the aggregate estimated loss adjusted for probability for both loans is $50,000 ((0×$100,000)+(50%×$100,000)). With this information the investor understands his or her true risk, which is zero for the first loan and $50,000 for the second loan. Moreover, with the probability of loss information credit risk management techniques may be focused on the loan with a 50% probability of loss to both reduce the estimated loss and the probability of loss rather than expending credit risk management techniques on the loan with a zero probability of loss.

The probability of loss for the mortgage loan is determined, in one example, by a summation of various probability factors including a base probability. Each probability factor is intended to account for the increased, or in some cases decreased, probability of loss relating to the factor. The various probability factors are discussed hereafter. The probability of loss determination begins with a base case, which is a set of assumptions about the mortgage loan for which the probability of loss is being determined (operation 1210). The assumptions include: a current loan to value ratio ("CLTV") of between 75 and 80 (the CLTV is the current loan amount divided by the current value of the property); a prime credit mortgage loan; a mortgage loan for a property that is a primary residence; and a mortgagor that is not in bankruptcy. These base assumptions reflect some of the typical characteristics of a mortgage loan. The probability of loss for the base case is zero.

The first probability factor added to the base probability accounts for the delinquency status of the mortgage loan. Generally, the more delinquent the mortgagor is in his or her payments, then the greater the probability that the mortgage loan will eventually experience a loss. In most cases, with each additional month of delinquency, the mortgagor accrues an additional month of interest, and out-of-pocket costs such as attorney fees to initiate foreclosure may also be incurred. In order to reinstate, or bring the mortgage loan current, the mortgagor must pay all accrued costs. Thus, over time, it becomes more difficult for the mortgage loan to be brought current, and more likely that the mortgage loan will fail to cure, and go to loss. If the mortgage loan is current, then the first probability factor is set to one, which is added to the base probability (operation 1212).

Operations 1212-1226 illustrate the probability factors for various delinquency states a mortgage loan may be in. The probability associated with each delinquency state may be adjusted at any time. If the mortgage loan is 30 days delinquent, then the first probability of loss factor is set to five, which is added to the base probability (operation 1214). If the mortgage loan is 60 days delinquent, then the first probability of loss factor is set to ten, which is added to the base probability factor (operation 1216). If the mortgage loan is 90 days delinquent, then the first probability of loss factor is set to 15, which is added to the base probability (operation 1218). If the mortgage loan is in the first month of foreclosure, then the first probability of loss factor is set to 20, which is added to the base probability (operation 1220). If the mortgage loan is beyond the first month of foreclosure proceedings, then the first probability of loss factor is set to 30, which is added to the base probability (operation 1222). If the mortgage loan is REO, then the first probability of loss factor is set to 99, which is added to the base probability (operation 1224). Finally, if there has been a realized loss, then the first probability of loss factor is set to 100, which is added to the base probability (operation 1226) (the probability of loss is 100%, indicating that the loss has already occurred). In a hypothetical example, if the mortgage loan is 60 days delinquent, then an interim probability of loss is: 0 (base probability)+10 (first probability factor for 60 days delinquent)=10.

A second probability of loss factor is added to the base probability to account for the actual CLTV for the mortgage loan. Generally, the greater the CLTV ratio, then the greater the probability of a loss on the mortgage loan and that the mortgage loan will experience a default. In addition, the greater the CLTV ratio, the greater the mortgage loan amount is in proportion to the value of the property. If the CLTV for the mortgage loan is less than or equal to 50, then the second probability of loss factor is set to negative 50 (−50), which is added to the probability of loss (operation 1228). A low CLTV ratio indicates that the mortgagor could sell the property and pay off the mortgage loan with the proceeds from the sale, which would allow the mortgagor to avoid foreclosure. If the CLTV for the mortgage loan is greater than 50 and less than or equal to 75, then the second probability of loss factor is set to zero, which is added to the probability of loss (operation 1230). If the CLTV for the mortgage loan is greater than 75 and less than or equal to 100, then the second probability of loss factor is set to 10, which is added to the probability of loss (operation 1232). Finally, if the CLTV for the mortgage loan is greater than 100, then the second probability of loss factor is set to 25, which is added to the probability of loss. Referring to the hypothetical example, if the CLTV=82, then the interim probability of loss is: 0 (base probability)+10 (first probability factor for 60 days delinquent)+10 (second probability factor for 75<CLTV<100)=20.

Next, a third probability of loss factor is added to the probability of loss to account for the type of mortgage loan. If the mortgage loan is subprime, then the third probability of loss factor is set to 15, which is added to the probability of loss (operation 1236). A subprime mortgage loan is generally given to a mortgagor with some flaw in his or her credit history; accordingly, subprime mortgage loans generally have a higher probability of loss. If the mortgage loan is an alternative credit mortgage loan, then the third probability of loss factor is set to five, which is added to the probability of loss (operation 1238). An alternative credit mortgage loan is one in which the mortgagor or the property has additional risk (except a bad credit risk, which would be classified as subprime). For instance, a mortgage loan extended to someone who is self-employed is considered high risk. Finally, in operation 1240, if the mortgage loan is prime (corresponding to the base case), then the third probability factor preferably is set to zero, which is added to the probability of loss. Referring to the hypothetical, if the mortgage loan is subprime, then the interim probability of loss is: 0 (base probability)+10 (first probability factor for 60 days delinquent)+10 (second probability factor for 75<CLTV<100)+15 (third probability factor for subprime mortgage loan)=35.

After the mortgage loan type is accounted for, then a fourth probability of loss factor is added to the probability of loss to account for the type of property. If the mortgage loan is for a second home, then the fourth probability of loss factor is set to negative five (−5), which is added to the probability of loss (operation 1242). Generally, only mortgagors with substantial financial means have a second home, which indicates that their probability of loss is somewhat unlikely. If the mortgage loan is for an investment property, the fourth probability of loss factor is set to five, which is added to the probability of loss (operation 1244). Mortgagors are usually very motivated to protect their primary and second residences from foreclosure, but much more willing to give up an investment property which is merely rented to a tenant. Much of this stems from the psychological stigma of losing one's home, versus the relatively painless experience of losing money on an investment. Finally, if the mortgage loan is for a primary residence (corresponding to the base case), then the fourth probability of loss factor is set to zero, which is added to the probability of loss (operation 1246). Referring to the hypothetical, for a second home the interim probability of loss is: 0 (base probability)+10 (first probability factor for 60 days delinquent)+10 (second probability factor for 75<CLTV<100)+15 (third probability factor for subprime loan)−5 (fourth probability factor for second home)=30.

Referring to FIG. 12b, following accounting for the property type, a fifth probability of loss factor to account for any bankruptcy proceedings is added to the probability of loss. If the mortgagor has filed for bankruptcy, there is an increased probability of loss because bankruptcy is a clear indication of financial distress. Not only is it less likely that the mortgagor will cure the default, it is also more likely that a loss will result, as the mortgagor will be unable to properly maintain the property, which will hurt its value. If the mortgagor is in chapter 13 bankruptcy, then the fifth probability of loss factor is set to ten, which is added to the probability of loss (operation 1248). If the mortgagor has filed for bankruptcy, but the chapter is unknown, then the fifth probability of loss factor is set to 10, which is added to the probability of loss (operation 1250). The most common chapter of bankruptcy is chapter 13, so if none is provided, then chapter 13 is assumed. If the mortgagor has filed for bankruptcy under any chapter besides chapter 13, then the fifth probability of loss factor is set to 10, which is added to the probability of loss (operation 1252). The court proceedings for other possible bankruptcy chapters are lengthy. Finally, if the mortgagor is not in bankruptcy (corresponding to the base case), then the fifth probability of loss is set to 0, which is added to the probability of loss (operation 1254). Referring to the hypothetical, for a mortgagor not in bankruptcy the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)=30.

Next, a sixth probability of loss factor to account for three specific risk factors (documentation level, FICO score, and property issues) is added to the probability of loss. The documentation level of a mortgage loan refers to the completeness of the application and supporting documentation submitted by the mortgagor when applying for the mortgage loan. For instance, some mortgage loans are made with only a W-2 Form to prove a mortgagor's income; others verify income with tax returns, bank statements and verbal confirmation from employers. Generally, well documented mortgage loans have less risk than low documentation or no documentation loans.

"FICO" is an industry term used to refer to the most common and all but universally used credit score, developed by and named for the Fair Isaac Company. Virtually every individual in the U.S. who has obtained any form of credit is assigned a FICO score. The score is higher when bills are paid on time and debt is repaid faster than required. Scores are lower when payments are missed. A FICO of 580 is an industry standard benchmark that indicates poor credit. Flawless credit would approach a perfect score of 800.

Property issues are circumstances related to the property. Any issue, such as uninsured damage, limited access or unused architecture, adds risk to the mortgage loan, as any issue implies that either money must be extended for repairs, or the property will be difficult to sell upon foreclosure.

If the mortgage loan is a low document mortgage loan, then the sixth probability of loss factor is set to five, which is added to the probability of loss (operation 1256). If the mortgage loan has a credit score (FICO) of less than 580, then ten is added to the sixth probability of loss factor, which is added to the probability of loss (operation 1258). If there is a property issue, such as uninsured termite damage or water damage, then 25 is added to the sixth probability of loss factor, which is added to the probability of loss. In one example, each of the three specific risk factors are considered individually; accordingly, more than one of the risk factors may apply to a mortgage loan. For example, the mortgage loan may be a low document mortgage loan and have a property issue, which would result in a sixth probability factor of 30. Finally, if there are no specific risk factors (corresponding to the base case), then the sixth probability of loss factor is set to zero, which is added to the probability of loss (operation 1262). Referring to the hypothetical, for a low document mortgage loan the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)=35.

After accounting for the specific risk factors, a seventh probability of loss factor to account for the timing of the payment loss is added to the probability of loss. An early payment default indicates a higher probability of eventual loss because it suggests that the mortgagor was ill prepared to make the mortgage loan payments. Mortgagors usually default after making several months of payments, and usually as the result of an event, such as death or unemployment.

When a mortgagor defaults within the first few months of the mortgage loan, unless there was a sudden event, the reason is usually that the mortgage loan was made based on false information. If the mortgagor cannot make the payments early on, it is unlikely that the situation will improve and the mortgage loan will reinstate.

If there is a first payment loss, then the seventh probability of loss factor is set to 15, which is added to the probability of loss (operation 1264).

If there is an early payment loss, then the seventh probability of loss factor is set to five, which is added to the probability of loss (operation 1266). It is assumed that a default in the first three months on a mortgage loan, is early. Finally, if there is not an early payment default (corresponding to the base case), then the seventh probability of loss factor is set to zero, which is added to the probability of loss (operation 1268). Referring to the hypothetical, for an early payment default the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)=40.

Referring to FIG. 12c, following accounting for the risk of early payment default, an eighth probability of loss factor to account for the financing of the mortgage loan is added to the probability of loss. If the mortgage loan is a cash-out refinancing, then the eighth probability of loss factor is preferably set to five, which is added to the probability of loss (operation 1270). A cash-out financing is one in which the mortgagor takes out a new mortgage loan on an existing property that is in excess of the existing mortgage loan. The new mortgage loan is used to pay off the existing mortgage loan, and the excess is paid to the mortgagor. This is a way of taking out the equity in a property, in the form of cash. Cash-out refinancing is risky for two reasons. First, it results in a higher LTV (loan to value ratio), which, all things being the same, would bring a greater probability of loss upon sale of the property than a lower LTV loan. Second, oftentimes mortgagors take out cash because of financial stress.

If the mortgage loan is an equity refinancing, then the eighth probability of loss factor is set to two point five (2.5), which is added to the probability of loss (operation 1272). An equity refinancing occurs when a mortgagor obtains a new mortgage loan of an amount equal to the existing mortgage loan on a property. The most common reason for an equity refinancing is to obtain a more favorable interest rate. The entire amount of the new mortgage loan is applied to pay off the existing mortgage loan. An equity refinancing is a lower risk event because it usually results in a lower mortgage loan payment, which makes it easier for the mortgagor to stay current on the mortgage loan. There is some risk with an equity refinancing, however, because the resulting LTV depends upon an accurate appraisal value. It is not unusual for the appraisal in an equity refinancing to be inaccurate, which means that, should the mortgage loan default, the property will be sold for less than the appraisal value upon which the mortgage loan was based, and a loss will be more likely to result.

If the mortgage loan is a purchase money mortgage loan, then the eighth probability of loss factor is set to negative five (−5), which is added to the probability of loss (operation 1274). A purchase money mortgage loan is the least risky mortgage loan type because of two factors. First, there is no cash being taken out. Second, the most accurate indication of value of a property is the price someone will pay to own the property. A purchase money mortgage loan is used to acquire a property. The acquisition, by its nature, is a strong confirmation of value.

Finally, if the mortgage loan purpose is not known, then the eighth probability of loss factor is set to zero, which is added to the probability of loss (operation 1276). Referring to the hypothetical, for an equity refinancing the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)+2.5 (eighth probability factor for equity refinancing)=42.5.

After accounting for the mortgage loan purpose, a ninth probability of loss factor to account for any exceptions in the underwriting of the mortgage loan is added to the probability of loss. Generally, underwriting exceptions indicate a higher probability of loss because they suggest that either the mortgagor should not have been qualified for the mortgage loan, or the property value was not as high as assumed when the mortgage loan was made (i.e., the true LTV is higher than stated). If there are underwriting exceptions, then the ninth probability of loss factor is preferably set to 10, which is added to the probability of loss (operation 1278). An exemplary underwriting exception is when the mortgage loan file shows, upon review, that the lender failed to verify the mortgagor's income with an independent source. This might be indicated by the verifier's surname being identical to that of the mortgagor, for example. This would suggest that the mortgagor overstated the income used as a basis for the mortgage loan, and that, in fact, the mortgagor is less able to make the mortgage loan payments than was assumed.

If there are no underwriting exceptions, then the ninth probability of loss factor is set to negative five (−5), which is added to the probability of loss (operation 1280). A mortgage loan without underwriting exceptions indicates that the mortgagor's loan application and supporting documents were reviewed, and it was found that, without exception, the lender obtained and verified all information upon which the decision to make the mortgage loan was based. A lower probability of loss than the base case is indicated because the base case assumes that all mortgage loans have some underwriting risk, a file that has been proven to have no underwriting risk is even less likely than the base case to result in loss. In the base case, the probability of loss factor for a mortgage loan is neither increased nor decreased, in other words 0 is added for underwriting exceptions (operation 1282), as it is assumed that all loans have some underwriting risk, and only those loans where the credit risk manager or servicer has performed a review and is aware of a specific risk, or has performed a review and has proven that there were no underwriting flaws for a particular loan, are adjusted for the risk or for the proof that there is no identifiable underwriting exception. Referring to the hypothetical, for a mortgage loan with underwriting exceptions the probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)+2.5 (eighth probability factor for equity refinancing)+10 (ninth probability factor for underwriting exceptions)=57.5.

The summation of the above-described probability of loss factors provides the overall probability of loss for a mortgage loan according to one aspect of the present embodiment. Referring to the hypothetical mortgage loan, the probability of loss is 57.5. In one example, if the probability of loss is less than 0, then it is rounded up to 0, and if the probability of loss is greater than 100, it is rounded down to 100 (operation 1184). The probability of loss indicates the likelihood that a loss will ultimately result from the mortgage loan. In the hypothetical, there is a 57.5% likelihood that a loss will result (and a 42.5% chance that a loss will not result). An exemplary loss reserve for a loss estimate of $100,000, and the probability of loss of 57.5%, is $57,500. The various values for the probability factors may be adjusted for various reasons including statistical evidence, and anecdotal evidence.

IV. Filters

To facilitate loss mitigation activities, one or more risk filters may be applied alone or together to a specified set of mortgage loans, such as a loss list, a mortgage loan pool, a specified combination of pools, and all pools. The risk filters may be used to identify particular mortgage loans that present some degree of risk of loss. Then, mitigating actions on those mortgage loans may be taken or the mortgage loan servicer may be contacted to verify that appropriate action is being taken. An investor would use the filters to identify loans that should be monitored, to establish or adjust loss reserves, and to identify loans that should be included or excluded from a loan pool. In addition, the underlying data used by the various risk filters for filtering is displayed for each mortgage loan in the credit risk manager screen shown in FIG. 2, and otherwise.

Embodiments of the invention include means for risk filtering a set of mortgages based on source illustrated in table 1 below, based on status illustrated in table 2 below, based on mortgage loan terms illustrated in table 3 below, based on property characteristics illustrated in table 4 below, based on borrower characteristics illustrated in table 5 below, based on servicing issues illustrated in table 6 below, based on mortgage loan history illustrated in table 7 below, based on mortgage insurance illustrated in table 8 below, based on loss exposure illustrated in table 9 below, and based on recovery illustrated in table 10 below. Each risk filter or combination of risk filters is used to filter a set of mortgage loans to particularly identify a certain subset of mortgage loans having a particular risk characteristic or characteristics. For example, the filters may be used to identify all mortgage loans from a certain issuer that are 90 days delinquent, subprime, in a depressed region, have a high CLTV ratio, a high loss estimate, and a high probability of loss. By identifying these high-risk loans, various loss-mitigating activities, such as restructuring the loan, may be performed which may eliminate or reduce any loss from these mortgage loans.

The following tables 1-10 identify the risk filters in each risk filter group. In the tables, "Datafeed" refers to an electronic transmission of data provided by a servicer or some other source, such as an electronic "bulletin board" website, or a subscription to a data provider; "Manual" refers to data that is entered manually by the credit risk manager or other user; and "Calculated" refers to consolidated data based on other data already in the system or manually entered into the system. An example of a calculation would be the value decline of a property since the origination of a mortgage loan, which is the difference between the value of the property on the origination date and the current value. If the original value was $100,000, and the current value is $90,000, then a $10,000 ($100,000-$90,000) value decline is calculated and stored as a data field. Note, value decline values are filtered with the "actual decline" filter, the original value of the property is filtered with the "original balance" filter, and the current value is filtered with "current balance" filter, each illustrated in Table 4.

TABLE 1

Source Risk Filter Group

| Filter Group - Source | Data Source |
| --- | --- |
| Servicer | Datafeed |
| Master Servicer | Manual |
| Issuer | Datafeed |
| Investor | Manual |
| Originator | Manual |
| Pool | Datafeed |
| Bond | Datafeed |

Table 1 illustrates Source risk filter group. FIGS. 13A-13C illustrate a plurality of user interfaces for accessing and using the various risk filters described in the tables. Referring to FIG. 13A, a source filter group (or level 1) user interface for working with the source filter group is illustrated. The source filter group user interface includes a source drop-down menu, a watch list drop-down menu and a hot list button. By selecting the source drop-down menu, the various Source risk filters illustrated in Table 1 are presented to the user. Upon selecting a particular source, such as issuer, the various issuers are illustrated in the source results window. The user, e.g., the credit risk manager, may then select one of the issuers listed in the results window and filter the entire database 118 of mortgage loans based on that particular issuer. The Source filters are particularly used to identify a set of mortgages for further filtering using the various filters described below in tables 2-10. For example, a set of mortgages of all loans with a particular servicer may be identified for further filtering, all loans of a particular pool or pools may be identified for further filtering, and all loans with a particular servicer and a particular pool may be identified for further filtering. The credit risk manager would then be able to concentrate effort on a single servicer at one time, which would greatly streamline the time involved in communicating with a servicer to address the loans that the servicer processes.

The watch list button is one way in which the user may add a loan to a watch list. Recall that one of the factors considered in determining whether a loan should be included in the loss list is whether the mortgage loan is on a watch list (FIG. 3, operation 304). Adding a mortgage loan to a watch list by using the watch list button allows the credit risk manager to follow risky mortgage loans more closely.

In one example, a user other than a credit risk manager, such as an investor in the pool of mortgages, generates an e-mail message that indicates that a mortgage loan should be added to a watch list. In order to distinguish the other user's watch list indication from the credit risk manager's indication, a hot list status is established. This indicates to the credit risk manager that the other party is concerned about a loan. Since the other party may not be as familiar with the pool or the servicer, or may not understand the methodology for loss estimation, liquidation date, or probability of loss as well as the credit risk manager does, the other party's notification is known as hot list. Loans that are identified as hot list loans are also marked for watch list, and appear on a watch list. The user may filter a set of mortgage loans in the database 118 based on characteristics that the third party user believes indicate heightened risk of loss. Alternatively, the credit risk manager or third party may manually add a mortgage loan to the hot list upon receipt of risk indicating information from a party such as a servicer.

TABLE 2

Status Risk Filter Group

| Filter Group - Status | Data Source |
|---|---|
| Active | Manual |
| Pending Information | Manual |
| Monitor | Manual |
| BK (In any Bankruptcy) | Manual |
| Payment Plan | Manual |
| Foreclosure | Datafeed |
| REO | Datafeed |
| 30 (30 days delinquent) | Datafeed |
| 60 (60 days delinquent) | Datafeed |
| 90 (90 days delinquent) | Datafeed |
| Closed | Datafeed |
| High Risk | Manual |
| Reinstated | Datafeed |
| Short Sale | Manual |
| Deed in Lieu | Manual |
| Indemnification | Manual |
| Repurchase Candidate | Manual |
| Transferred | Manual |
| Litigation | Manual |
| Paid Off | Datafeed |
| Substitution | Manual |
| REO Loss Contested | Manual |
| Contest Remaining Loss | Manual |
| Repurchased | Manual |
| MI Insured Loss | Datafeed |
| Short Sale Deficiency | Manual |
| Contest Amount Paid | Manual |

The Status risk filter group illustrated in Table 2 allows a credit risk manager or other user of the system to filter a set of mortgage loans by the current status of the mortgage loans. In one example, the Status risk filter group includes an active filter, a pending information filter, a monitor filter, a bankruptcy (BK) filter, a payment plan filter, a foreclosure filter, a real estate owned (REO) filter, a 30-days delinquent filter, a 60-days delinquent filter, a 90-days delinquent filter, a closed filter, a high risk filter, a reinstated filter, a short sale filter, a deed in lieu filter, an indemnification filter, a repurchase candidate filter, a transferred filter, a litigation filter, a paid off filter, a substitution filter, an REO loss contested filter, a contest remaining loss filter, a repurchase filter, a mortgage insurance (MI) insured loss filter, a short sale deficiency filter, and a contest amount paid filter for filtering the set of loans to identify all of the mortgage loans that are active, pending information, being monitored, etc.

A loan that is "active" has on-going loss mitigation activities associated with it, such as working with a mortgagor on a payment plan to reduce the risk that the property will be sold in foreclosure. A loan with "pending information" means that a credit risk manager has requested information from a source, such as the servicer, and the information has not yet been received; until the requested information is received, no further action can be decided upon. A loan being monitored, means that a credit risk manager is watching the mortgage loan for one or more months in order to verify that the loan performs as expected, i.e., that foreclosure is filed and proceeds within the state's normal timeframe. A mortgage loan that is "closed" indicates that the balance for the mortgage loan is zero, and there are no mitigation activities available.

A loan that is "high risk" has been manually marked as high risk by a user because of some indication that the loan presents an unusually high risk, such as $1,000,000 property, for which almost any outcome other than paying in current status presents a very high likelihood of a loss. A mortgage loan that is "reinstated" indicates that it has moved from an "F" or "R" delinquency status, to a "C," "3," "6," or "9" status. A mortgage loan that is a "short sale" indicates that there was a sale with a loss, but the mortgage loan was not REO, i.e., the mortgagor sold the property for less than the amount of total debt, and the servicer agreed that, although this resulted in a loss, the resultant loss was probably less than the potential loss after the risks associated with the foreclosure and REO sale were taken into consideration. "Short sale deficiency" indicates that the borrower makes payments to reduce the loss after a short sale. "Deed in lieu" indicates that the borrower forfeited title, and the mortgage loan became REO without going to foreclosure sale. "Indemnification" indicates that the servicer will reimburse the pool for any loss or an agreed upon portion of a loss on a particular mortgage loan. "Repurchase candidate" indicates that a user has requested that the mortgage loan be removed, i.e., repurchased, from the pool, and "repurchase" indicates that the loan was removed. "Transferred" indicates that the mortgage loan is no longer part of the pool and does not need to be monitored. "Litigation" indicates that the borrower or other party is contesting the mortgage loan or foreclosure. "Paid-off" indicates that the loan closed early and that the closing was not through default, i.e., the borrower sold the property or obtained a new loan or paid cash to pay off the loan. "MI insured loss" indicates that mortgage insurance will pay some or all of the loss. "Substitution" indicates that one loan was substituted for another loan in the pool.

The status of the mortgage loan can help a credit risk manager evaluate the risk of loss that the mortgage loan presents to the pool. For example, mortgage loans that are 90 days delinquent indicate that the mortgagor is having difficulty making payments, and hence the mortgage loan presents some risk of loss to the pool. The credit risk manager can filter a selected set of mortgage loans to identify all of the mortgage loans that are 90 days delinquent, and then pursue various loss mitigation activities. For example, for loans that are 90 days delinquent, but have not gone into foreclosure in the usual time period, the credit risk manager can attempt to discover what is delaying the beginning of foreclosure and attempt to correct the cause of the delay. In another example, the credit risk manager might investigate work-out options to help avoid foreclosure altogether, such as a payment plan for the mortgagor.

One loss mitigation activity that is facilitated with aspects of the present invention, is contesting some occurrence with the loan. Various risk filters in Table 2, such as REO loss contested, contest remaining loss, and contest amount paid filter a set of mortgage data by whether it is being contested. For example, a loss of $500,000 might be reported for a loan that was sold in foreclosure. However, the estimated loss for the loan according to the methods described herein (see FIGS. 5-11) is $50,000. One reason for such a discrepancy might be a simple accounting error where an extra zero was added to the loss. The loss can be contested, and if the estimated loss found to be correct, then the investor will have been saved $450,000.

Referring again to FIG. 13A, a status risk filter or level 2 risk filter user interface is illustrated. The status user interface includes a status window, a delinquency window and a watch list status window. These windows are used to select the various risk filters illustrated in Table 2. For example, the delinquency window includes a 30 day delinquent risk filter used to sort through a set of mortgage loans to identify all mortgage loans that are 30 days delinquent. The user may also mark a loan using the level 2 user interface to reflect on-going loss mitigation activities, such as marking a loan as "active," "pending information," or "monitor."

TABLE 3

Mortgage Loan Terms Filter Group

| Filter Group - Loan Terms | Data Source |
|---|---|
| Purpose of loan | Datafeed |
|   Purchase | Datafeed |
|   Cash-Out Refinancing | Datafeed |
|   Equity Refinancing | Datafeed |
|   Construction | Datafeed |
|   Assumption | Manual |
|   Home Equity Line of Credit | Manual |
|   Employer Loan | Manual |
|   Loan to Facilitate | Manual |
|   Second Mortgage | Manual |
|   Unknown | Manual |
| Loan Type | Datafeed |
|   Adjustable Rate Mortgage (ARM) | Datafeed |
|   Stepped | Datafeed |
|   Balloon | Datafeed |
|   Fixed | Datafeed |
|   Other | Datafeed |
| Product | Datafeed |
|   SubPrime | Datafeed |
|   Prime | Datafeed |
|   Alt-A | Datafeed |
|   Junior Liens | Datafeed |
|   Second Lien | Datafeed |
|   Manufactured Housing | Datafeed |
|   Home Equity Line (HEL) | Datafeed |
|   Whole Loan | Datafeed |
| Occupancy | Datafeed |
|   Primary Home | Datafeed |
|   Second Home | Datafeed |
|   Investment Property | Datafeed |
|   Land | Datafeed |
|   Unknown | Datafeed |
| Documentation Level | Datafeed |
|   Full Documentation | Datafeed |
|   Low Documentation | Datafeed |
|   No Documentation | Datafeed |

Table 3 illustrates the Mortgage loan term filter group with a set of risk filters that are used to filter a set of mortgage loans based on the mortgage loan terms. Table 3 includes five subgroups: the purpose of the loan filter group, the loan type filter group, the product filter group, the occupancy filter group and a documentation level filter group. The risk filters in the purpose of the loan subgroup are used to filter a set of loans based on the purpose for obtaining the mortgage loan. In one example, the purpose of the loan filter group includes a purchase filter, a cash-out refinancing filter, an equity refinancing filter, a construction filter, an assumption filter, a home equity line of credit (HEL) filter, an employer loan filter, a loan to facilitate filter, an unknown filter, and a second mortgage filter. The purpose for obtaining a mortgage loan can help a credit risk manager identify varying degrees of risk that the mortgage loan may present. For example, a loan obtained to purchase a home (identified with the purchase filter) is generally considered to pose less risk than an equity refinancing loan (identified with the equity refinancing filter).

In another example, a cash-out refinancing (Cash-Out Refinancing filter), in which a larger loan than previously existed on the property is taken out, and the difference between the previous loan, once paid off, and the amount borrowed, is given to the borrower in the form of cash, is generally considered to pose more risk than a purchase money mortgage (Purchase filter) or equity refinancing (Equity Refinancing filter) because it increases the CLTV and it also may indicate that the borrower had financial difficulties and needed the money taken out. A construction loan (Construction filter) poses certain risks since it is assumed that it will be repaid upon construction completion; the completion must be verified to have taken place, and a new loan large enough to repay the construction loan must be obtained. An assumption loan (Assumption filter) is one in which the borrower takes over a loan from a previous borrower. This is commonly done when an event makes it impossible for the previous borrower to continue to make the loan payments, such as death or disability, and a relative or other friend of the borrower wishes to take over responsibility for the property but is unable to obtain a mortgage loan for the property in his or her own right. This indicates that the new borrower should not have qualified for the mortgage loan, and that it poses a greater risk of default.

A home equity line of credit (Home Equity Line of Credit filter) is a loan secured by the equity, or the difference between the property's value and the outstanding loan amount, previous to the home equity line of credit being issued. The home equity line of credit raises the CLTV, oftentimes to more than 100%, and increases the risk of loss in the event of default greatly. Since the home equity loan is a line of credit, it may be drawn against in small or large increments, and paid back in small or large increments, so long as a minimum monthly payment is made. An employer loan (Employer Loan filter) is one in which a large employer has a program whereby its employees are offered favorable rates or terms for mortgages, most commonly in order to encourage the employees to move to a new location. Such mortgages are considered to have favorable risk profiles, because most employees are extremely reluctant to risk their employer's knowledge of a mortgage default. A loan to facilitate (Loan to facilitate filter) is a loan offered by the seller to encourage the buyer of a property to complete the purchase. A seller might offer a buyer a loan when the buyer could not otherwise qualify for a loan, or could not obtain favorable loan terms, or did not want to have an additional loan reported on his or her credit report.

A second mortgage (Second Mortgage filter) is like a home equity line of credit, in that it is a way for a borrower to borrow the difference between a property's value and the existing mortgage loan on the property, but unlike an equity line of credit it is a one-time, single amount borrowed, and it is repaid in regular monthly payments. A second loan has a higher risk probability than a first mortgage loan, because the servicer cannot foreclose the property without first paying off the first mortgage loan. A borrower will pay the first mortgage loan before making payments on the second mortgage loan because of this reduced risk of foreclosure associated with the second loan. Unknown loan (Unknown filter) purposes exist because of poor documentation in loan files, and may be used as a risk filter to identify weaknesses in loan origination procedures, or to identify loans for further risk filtering to identify their nature.

In one example, the loan type subgroup includes an adjustable rate mortgage (ARM) filter, a stepped filter, a balloon filter, a fixed filter, and an "other" filter. A stepped or adjustable rate mortgage can result in payment shock to the mortgagor when the interest rate for the mortgage loan goes up, and hence the monthly mortgage payment for the loan goes up. Using the ARM filter, the stepped filter, and/or the balloon filter, the credit risk manager can filter a set of mortgage loans to identify all of the loans in the set of mortgage loans that have adjusted in the past 90 days. The credit risk manager may then filter the list to further list each loan that is also 30 days delinquent, and thereby identify each mortgage loan that may have a mortgagor experiencing payment shock from the adjustment. These loans may further be added to the watch list, so that the credit risk manager can continue to monitor the loans until the mortgagor recovers from their payment shock.

In one example, the product filter group includes a subprime filter, a prime filter, an Alt-A filter, and a junior lien filter. An Alt-A mortgage loan refers to a situation where the mortgagor has Alternative A (Alt-A) credit. Alt-A credit oftentimes indicates that the mortgagor generally has A Credit, the highest credit rating, but has one or more factors that increase the risk on the loan, such as self employment, where the mortgagor cannot independently document their income. Although not specifically shown in the tables, filters for each type of credit may be included, such as A credit, B credit, C credit, and D credit. The junior lien, or second lien, filter indicates all loans that are junior to another loan.

The occupancy subfilter group includes a primary home risk filter, a second home risk filter, an investment property risk filter, a land risk filter, and an unknown risk filter. The occupancy associated with a mortgage loan can help a credit risk manager to identify varying degrees of risk that mortgage loans may pose. For example, a mortgage loan taken out for a primary home or residence (identified with the primary home filter) generally is considered to pose less risk than a mortgage loan taken for an investment property (identified with the investment property filter). Strategies to work-out loans, or to minimize the risk of loss, differ according to the occupancy of the property. There are no eviction risks associated with vacant land (Land filter), for instance, although there can be uninsured liability risk, for instance from a sink hole developing in a rain storm, with the risk of erosion made much greater on the unimproved property than would have been the case on a landscaped parcel with a building and foundation in place. Accordingly, credit risk managers can sort through sets of loans based on the occupancy associated with the mortgage loan and take appropriate loss mitigation action if necessary.

The documentation level subfilter group includes a full documentation risk filter, a limited documentation risk filter and a no documentation risk filter. The documentation level associated with obtaining a mortgage loan can help the credit risk manager identify risky loans. For example, full documentation loans (identified with full documentation filter) are generally considered to have less risk than loans obtained with no documentation (identified with no documentation risk filter). Documentation is the paperwork and verification done to determine the validity of a borrower's financial situation. In a full documentation loan, the lender might obtain written verification from the borrower's employer as to the borrower's salary, whereas in a low documentation loan the lender might accept a verbal confirmation from a party identified by the borrower as his or her employer, without any attempt to verify that the party is not, in fact, a relative or friend of the borrower.

Referring again to FIG. 13A, a loan terms or level 3 user interface is illustrated. The loan terms user interface includes six risk filter windows identified as "purpose," "occupancy," "loan type," "doc level," and "product" which generally correspond with the loan term subfilter groups with the same names. The level 3 user interface also includes a "property" window used for accessing the property type risk filters illustrated in Table 4 and discussed below. These windows are used to select the various loan term risk filters identified in Table 3.

The loan terms user interface further includes a loan-to-value (LTV) risk filter input field, an original FICO risk filter input field, an original balance risk filter input field and a current balance risk filter input field. In any of the input fields, a credit risk manager or other user of the system enters a particular value or values (or %) that he or she would like to filter by. For example, in the current balance risk filter input field, the credit risk manager might enter $500,000 to $600,000 and all mortgage loans in the set of mortgage loans being filtered having the balance range would be displayed. Higher balance loans pose more risk than loans of an average amount. The loan terms user interface further includes an MI drop-down window for selecting a particular mortgage insurer and filtering by the selected mortgage insurer. The credit risk manager could then discuss the identified loans with the selected mortgage issuer without having to manually sort through a list including loans not insured by that mortgage insurer.

TABLE 4

Property Characteristics Risk Filter Group

| Filter Group - Property Characteristics | Data Source |
| --- | --- |
| State | Datafeed |
| Zip Code | Datafeed |
| Property Type | Manual |
|   Single Family | Manual |
|   1-4 Family | Manual |
|   5 + Family | Manual |
|   Condo | Manual |
|   Co-op | Manual |
|   Planned Unit Development (PUD) | Manual |
|   Manufactured Housing | Manual |
|   Townhouse | Manual |
|   Row House | Manual |
|   Mobile Home | Manual |
|   Unknown | Manual |
|   Land | Manual |
| Property Issue | Manual |
|   Natural Disaster | Manual |
|   Damage | Manual |
|   Vandalism | Manual |
|   Winterization | Manual |
|   Value Decline | Manual |
|   Insured | Manual |
|   Uninsured | Manual |
|   Borrower Intention | Manual |
| Property Value | Datafeed |
|   Original Balance | Datafeed |
|   Current Balance | Datafeed |
|   Original LTV % | Datafeed |
|   Current LTV % | Calculated |
|   Estimated Decline | Calculated |
|   Actual Decline | Calculated |
|   Current HPI | Calculated |
|   Combined Original LTV | Calculated |
|   Combined Current LTV | Calculated |
|   Current BPO | Datafeed |
|   REO appraised | Manual |
|   Prepayment Penalty | Calculated |

Table 4 illustrates the Property Characteristics risk filter group, which includes a set of filters used to sort through a set of mortgage loans based on a property characteristic associated with the mortgage loan. The Property Characteristics filter group includes a state filter and a zip code filter used to filter a set of mortgage loans based on the state of the property associated with the mortgage loan and the zip code of the property associated with the mortgage loan. A particular state or zip code may have an associated degree of risk. For example, a particular state, such as Hawaii, may be experiencing an economic downturn causing higher risks for mortgage loans in that state. During the same period, a different state, such as Florida, may be experiencing an economic boom and have less risk for mortgage loans on properties in that state. The state and zip code filter allow a credit risk manager to focus loss mitigation activities on mortgage loans associated with higher risk geographic locations.

The Property Characteristics filter group further includes a property type subgroup. The property type subgroup includes a single family home filter, a 1-4 family home (e.g., duplex)

filter, a 5+ family home (e.g., townhome complex, small apartment) filter, a condominium filter, a cooperative filter, a PUD filter, a mobile home filter, a manufactured home filter and a townhouse filter. The property type associated with a mortgage loan can help a credit risk manager identify risky loans. For example, the cooperative filter identifies all loans for cooperative properties, which can be difficult to sell because the buyer must be approved by the members of the co-op. A mobile home filter can identify loans that are risky because they are governed by the rules of the Uniform Commercial Code, rather than by standard mortgage loan and real estate laws which a servicer might be more familiar with. Multiple family homes (1-4 family and 5+ family) have certain risks, in that they have a high probability of tenants living in them, which indicates a greater likelihood that eviction will be necessary and that the property will not have been maintained. They also indicate a greater likelihood that they are investment properties, even though this was not stated on the loan application.

The Property Characteristics filter group further includes a property issue subgroup having a natural disaster filter, a damage filter, a vandalism filter, a winterization filter, a value decline filter, an insured filter, an uninsured filter, and a borrower intention filter. The property issue filters are used to identify mortgage loans with property issues. For example, the winterization filter lists all loans where damage occurred due to the home owner failing to winterize the property properly, such as failing to have adequate heating during the winter months causing the pipes to burst. Typically, damage resulting from a natural disaster, vandalism, etc. is entered by the credit risk manager. If damage to a property is insured or uninsured, then the credit risk manager will update the loan data to reflect the insured or uninsured status and the insured filter or uninsured filter, respectively, will list all the loans with insured or uninsured damages. In some instances a borrower that is upset, such as during foreclosure, will say that he or she intends to damage the property. In these instances, a borrower intent flag may be associated with the mortgage loan, and any loans with the borrower intent flag set, will be listed when the borrower intention filter is used. Preemptive measures might be taken then, such as posting a security guard at the property or verifying that insurance coverage is adequate.

The various property issues that may be associated with a property pose varying degrees of risk. For example, a property that has been vandalized can indicate that the property value may have declined, and may also indicate a geographic area with generally declining property values. In the example of vandalism providing some indication of declining property values, the vandalism filter can be used in conjunction with the zip code filter to identify mortgage loans from a set of loans for the general geographic area associated with the vandalism, thereby identifying a very specific subgroup of loans related to the geographic area that the vandalism is occurring in.

Finally, the Property Characteristic filter group includes a property value subgroup having an original balance filter, a current balance filter, an original loan to value (LTV) filter, a current LTV filter, an estimated decline filter, an actual decline filter, a current HPI filter, a combined original LTV filter, a combined current LTV filter, a current BPO filter, an REO appraised filter, and a prepayment penalty filter. In one example, the original balance or current balance property value filters can help a credit risk manager identify high value mortgage loans (e.g., $650,000), which in some instances are indicative of a higher risk simply because of the higher value. In another example, a loan with a high combined current LTV indicates that there is little or no equity remaining in the property, which means that the borrower may be suffering financial distress, that the borrower no longer has the equity as a financial reserve to turn to in the event of job loss or temporary disability, and that the property will more certainly liquidate at a loss should it be foreclosed. This directs the credit risk manager in determining what loss mitigation alternatives remain available to that borrower. The estimated property value decline, in one example, for each mortgage is the original appraisal for the property minus the estimated current market value for the property (see FIG. 6) divided by the original appraisal.

Estimated Decline=(original appraisal for the property−estimated value for the property)/original appraisal The actual decline uses the same equation as used for the estimated decline, except that the actual value of the property is used in place of the estimated value for the property. Filtering for properties with a high actual or estimated value decline enables the credit risk manager to identify properties whose original appraisal value may have been fraudulent, or to identify properties whose current value may be erroneously reported at a very low amount.

The current housing price (HPI) value filtered with the current HPI filter uses a calculation to determine the current HPI for each mortgage loan. First, the estimated current value of a property is calculated by multiplying the original appraised value of the property by either 80% (for a prime mortgage loan) or 70% (for a subprime mortgage loan), to arrive at a distressed value of the property. Next, the distressed value is then increased to account for market appreciation in the property's geographic region by multiplying the distressed value by one plus the sum of the quarterly appreciation factors published by Freddie Mac in its quarterly Housing Price Index to provide the current HPI.

Current HPI=(original appraisal value for the property×80% (for a prime mortgage loan) or 70% (for subprime loan) (1+Σ quarterly appreciation factors)

For example, a property securing a prime mortgage loan with an original appraised value of $100,000 would have a distressed value of $100,000×80%=$80,000. If the property was originated five years (20 quarters) ago, and the sum of the quarterly housing price appreciation factors for those 20 quarters was 30%, then the current HPI (current dollar value of the property based on HPI calculation) would be $80,000×(1+0.3)=$104,000.

The combined current LTV, in one example, is the ratio obtained by dividing the sum of the current outstanding principal balance of a mortgage loan and any second or subordinate mortgage loan secured by the same property, by the current value of the underlying property, which may be estimated.

Combined Current LTV=(current outstanding principal balance of primary loan+current outstanding balance of second loan)/current value of property For example, a $100,000 mortgage loan with a $20,000 second mortgage loan resulting in combined current loan balance of $120,000, divided by a current property value of $150,000 would result in a combined current LTV of 80. The combined original LTV uses original values in place of current values.

The current LTV is the ratio obtained by dividing the current outstanding principal balance of a mortgage loan by the current value of the underlying property (e.g., $100,000 balance on a mortgage loan divided by a current value of $150,000, resulting in a current LTV of 67.

Current LTV=current outstanding principal balance/ current value of property (may be estimated)

The prepayment penalty result, used by the prepayment filter, is expressed in dollars, and is the prepayment penalty percentage allowable according to the specific terms of a particular mortgage loan multiplied by the current balance of the loan. For example, if a mortgage loan has a 1% prepayment penalty and a current balance of $100,000, then the prepayment penalty is calculated to be $1,000. A prepayment penalty is a fee collected from the borrower when he or she pays off a loan prior to the expiration of a stated period of time, such as five years. The prepayment penalty compensates the investor for the foregone interest that would have been collected from the borrower over the stated time period, and discourages the borrower from paying his or her loan off early.

Referring to FIG. 13B, a property characteristics or level 5 user interface is illustrated. The property characteristics user interface includes a zip code risk filter input window for entering a zip code to filter by and a state drop-down menu for selecting a particular state for filtering a set of mortgage loans. The property characteristics user interface further includes a property issue window including the risk filters generally identified under the property issue subgroup of Table 4. As mentioned earlier, the risk filters associated with the property type filter subgroup of Table 4 are accessed with the level 3 user interface illustrated in FIG. 13A. In addition, the property value risk filters identified in Table 4 are also accessed with the level 3 user interface. However, the estimated decline risk filter and the actual decline risk filters identified in the property value subgroup of Table 4 are accessed from the level 5 property user interface illustrated in FIG. 13B. The credit risk manager may enter a range for the actual decline or an estimated decline value using the corresponding input fields of the property user interface.

TABLE 5

| Borrower Characteristics | |
| --- | --- |
| Filter Group - Borrower Characteristics | Data Source |
| Original FICO (Fair Issacs Credit Score) | Datafeed |
| Current FICO | Datafeed |
| Reason for Default | Manual |
|    Death of Principal Mortgagor | Manual |
|    Illness of Principal Mortgagor | Manual |
|    Death in Borrower's Family | Manual |
|    Illness in Borrower's Family | Manual |
|    Marital Difficulties | Manual |
|    Unemployed/Temp. Loss of Income | Manual |
|    Excessive Use of Credit | Manual |
|    Bankruptcy | Manual |
|    Abandonment of Property | Manual |
|    Self-employment | Manual |
|    Curtailment of Income | Manual |
|    NSF Check | Manual |
|    Payment Adjust/Shock | Manual |
|    Dissatisfaction with Property | Manual |
|    Natural Disaster | Manual |
|    Fire/Property Loss | Manual |
|    Due on Transfer | Manual |
|    Assumption | Manual |
|    Payoff Pending | Manual |
|    Fraud | Manual |
|    Unable to Contact | Manual |
|    Decline in Property Value | Manual |
|    Distant Employment Transfer | Manual |
|    Property Problem | Manual |
|    Inability to Sell Property | Manual |

TABLE 5-continued

| Borrower Characteristics | |
| --- | --- |
| Filter Group - Borrower Characteristics | Data Source |
|    Inability to Rent Property | Manual |
|    Unknown Hardship-tenant default | Manual |
|    Military Service | Manual |
|    Business Failure | Manual |
|    Casualty Loss | Manual |
|    Servicing Problems | Manual |
|    Payment Dispute | Manual |
|    Transfer of Ownership Pending | Manual |
|    Incarceration | Manual |
|    Utility/Energy Cost | Manual |
|    No Delinquency Code to Report | Manual |
|    Disregard for Obligation | Manual |
| Servicer Failed to Provide | Manual |
| Multiple Loans | Manual |
| Borrower Name | Manual |
| Fraud Suspect (Y or N) | Manual |
| Litigation (Y or N) | Manual |
| Multiple Bankruptcies | Manual |

Table 5 illustrates the Borrower Characteristics filter group. The Borrower Characteristics filter group includes an original FICO filter, a current FICO filter, a reason for default subgroup, a multiple loans filter, a borrower name filter, a fraud suspect filter, a litigation filter, and a multiple bankruptcies filter. The Borrower Characteristics filter group allows a credit risk manager to sort through and identify particular mortgage loans associated with some of these identified borrower characteristics. In one example, borrower characteristics for each loan are compiled from an Altel-CPI servicing system. In another example, the credit risk manager may manually note a borrower characteristic upon its discovery, for instance if a realtor notifies the credit risk manager that the borrower has been involved in a number of fraudulent loan situations in the area in recent months, in which case the credit risk manager would flag the borrower as a fraud suspect.

Referring to FIG. 13B, a borrower or level 6 risk filter user interface is illustrated. The borrower user interface allows the credit risk manager to filter the mortgage loan set with the risk filters identified in Table 5. In one example, the borrower user interface includes a last name input field for the credit risk manager to input a last name to filter by, a fraud suspect drop-down menu for the credit risk manager to select yes or no if the person entered in the last name is considered a fraud suspect, a litigation drop-down menu for selecting yes or no if pending litigation is known, and a reason for default (RFD) drop-down menu for selecting any of the reasons for default filters illustrated in Table 5. The borrower user interface further includes a multiple bankruptcy (BK) input field. Each loan can include an indication of the number of bankruptcies that the borrower has been through. The multiple bankruptcy field provides for the user to enter a number, such as "3," into the multiple BK field and all loans in the set that include an indication of three or more bankruptcies will be listed.

A credit risk manager might use the Borrower Characteristic filters in a number of ways. For example, the credit risk manager might use the FICO filter to list all low FICO scores, and then sort the low FICO scores further by all multiple bankruptcies. The resultant list of loans might then be added to the watch list because they represent an unusually high risk. If at a later time, these loans are being analyzed by the credit risk manager and one of the loans is 60 days delinquent, the credit risk manager might immediately take further action, such as calling the servicer to find out why the borrower is missing payments.

The reasons for default can be used, for example, to determine a particular loss mitigation technique that would be useful to avoid foreclosure. For example, if the borrower has defaulted because of a death (death of principal mortgage filter), then there is likely no loss mitigation activity that would be helpful. If the borrower is temporarily unemployed (unemployed/temp. loss of income filter), then a payment plan or repay plan may be very helpful in avoiding foreclosure.

TABLE 6

Servicing Issues Risk Filter Group

| Filter Group - Servicing | Data Source |
|---|---|
| Foreclosure Delay | Manual |
| Repurchase | Manual |
|   Declined | Manual |
|   Approved by Servicer | Manual |
|   Approved by Seller | Manual |
|   Pending Receipt | Manual |
| Servicing Issue | Manual |
| Trustee/Reporting Issue | Manual |

Table 6 illustrates the Servicing Issues filter group, which includes a foreclosure delay filter, a reason for delay filter, a repurchase subfilter group, a servicing issue filter, and a trustee/reporting issue filter. The foreclosure delay filter is used to identify any loans with a delayed foreclosure. The repurchase subfilter group includes a declined filter, an approved by servicer filter, an approved by seller filter and a pending receipt filter. For some loans, the credit risk manager, the servicer, or some other party, might suggest to the issuer that a loan be repurchased. The repurchase request may be declined (determined by the repurchase declined filter), or it might be approved by the servicer (approval by servicer filter), then the seller (approval by seller filter), and at some point funds from the repurchase will be distributed (pending receipt filter). Servicing issues and trustee reporting issues are identified by the credit risk manager and a brief description of the issue is described. For example, if a servicer provides incorrect data about a loan, then the credit risk manager can identify the problem and associate it with the loan.

Referring to FIG. 13C, a servicing risk filter user interface is shown, which generally corresponds with the Servicing Issues risk filter group. The servicing user interface includes a trustee reporting issue window, a repurchase window, a servicing issue window and a foreclosure delay window for applying the corresponding servicing issue risk filter of Table 6.

TABLE 7

Loan History Risk Filter Group

| Filter Group - Loan History | Data Source |
|---|---|
| Time in Status | Datafeed |
|   Time in F - over x months | Datafeed |
|   Time in R - over x months | Datafeed |
|   Time in 9 - over x months (90 days delinquent) | Datafeed |
|   Time in 6 - over x months (60 days delinquent) | Datafeed |
|   Time in 3 - over x months (30 days delinquent) | Datafeed |
| Exceeds Liquidation Timeline | Datafeed/Manual |
|   Exceeds Est. Foreclosure Time | Datafeed/Manual |
|   Exceeds Est. REO Time | Datafeed/Manual |
|   Exceeds Est. 90 Days Delinquent Time | Datafeed/Manual |
|   Exceeds Payment Plan | Datafeed/Manual |
|   Exceeds Bankruptcy | Datafeed/Manual |
| Last Interest Paid Date | Datafeed |
| Paid Off Loans | Manual |
| C-0, 3-0, 6-0, 9-0, F-0, R-0 (delinquency history string code sequence) | |
| Unusual String | Datafeed |
|   C-9, C-F, C-R, F-9, F-6, F-3, R-9, R-6, R-3 (delinquency history string code sequence) | |
| Delay Status | |
|   Payment Plan | Manual |
|   Bankruptcy | Manual |
| End Date Expiring | Datafeed/Manual |
|   Payment Plan End Date | Datafeed/Manual |
|   Bankruptcy Est. End Date | Datafeed/Manual |
|   Foreclosure Est. End Date | Datafeed/Manual |
|   REO Est. End Date | Datafeed/Manual |
|   BK Chapter: 7, 11, 13 | Datafeed/Manual |

Table 7 illustrates the set of risk filters in the Loan History risk filter group. The Loan History risk filter group generally allows a credit risk manager to sort through a set of mortgage loans based on any occurrences that might have happened in the mortgage loan history. The loan history risk filter group has a time in status subgroup including a time in foreclosure risk filter, time in REO risk filter, a time 90 days delinquent, a time 60 days delinquent risk filter, and a time 30 days delinquent risk filter. In one example, the time in foreclosure risk filter allows a credit risk manager to sort through a set of loans that have been in foreclosure for a period of some time (e.g., days, months or years) specified by the credit risk manager. The same is true with the time in REO, the time 90 days delinquent, the time 60 days delinquent and the time 30 days delinquent risk filters. A loan that has a delinquent status, such as foreclosure or REO, for some period of time indicates a heightened risk of loss and heightened severity of the risk of loss. For example, a loan that is in the first month of foreclosure has a lower projected severity of loss as compared with a mortgage loan in foreclosure that is exceeding the time expected for the foreclosure proceedings to occur.

The Loan History risk filter group further includes an exceeds timeline subgroup having an exceeds estimated foreclosure time filter, an exceeds estimated REO time filter, an exceeds estimated time in 90 days delinquent filter, an exceeds payment plan filter, and an exceeds bankruptcy estimated time to termination filter. As discussed in Section IIB, foreclosure timing, REO timing and the like have associated projected times for these procedures to take place. For each loan, liquidation timing is determined according to the methods illustrated in the flowcharts shown in FIGS. 7-10. One advantage of the liquidation timing determination is that it is broken-up into several discrete timing factor determinations for a payment plan ($TF_{payplan}$), a bankruptcy ($TF_{bankruptcy}$), a litigation ($TF_{litigation}$), a foreclosure ($TF_{foreclosure}$), and a REO marketing ($TF_{REOmarketing}$) period. Each factor generates an associated estimated liquidation timing which is associated with the loan.

The exceeds timeline filters allow the credit risk manager to identify any loan that has exceeded the estimated liquidation time for any of the liquidation timing factors. By breaking the liquidation timing down into these discrete factors and being able to search by factor, the credit risk manager can identify loans that are delayed during different stages of liquidation and perform loss mitigation during each stage of liquidation if need be, and thereby significantly reduce overall losses caused by liquidation delays. For example, when a mortgage loan is in foreclosure for a time period longer than that expected, this may indicate that there are some problems with the foreclosure proceeding. The credit risk manager can sort through a set of mortgage loans based on loans exceeding the estimated foreclosure time to identify these loans, and help fix whatever problem may be causing the foreclosure delay. In some situations, the foreclosure time delays may be due only to a lack of being able to find some particular document necessary for the foreclosure or some other administrative issue. The credit risk manager can help solve the problem and thereby move the mortgage loan through the foreclosure proceeding more rapidly and hence reduce losses because of foreclosure timing delays.

The Loan History filter group further includes a paid-off loan filter, an unusual string filter, a delay status filter, a payment plan filter, and a bankruptcy filter. The paid off filter is used to identify any mortgage loan that is paid off. In one example, a loan is considered paid off if the delinquency history string ends in a "0." Therefore, the paid off filter lists each mortgage loan in the set being examined that has a delinquency history string ending in "0." The unusual string filter lists any mortgage loan having an unusual delinquency history string, such as C to 9, C to F, C to R, F to 9, F to 6, F to 3, R to 9, R to 6, and R to 3. An unusual string is generally considered as any delinquency string that deviates from the expected course. For example, C to 9 indicates that in one month the mortgage loan payments were current, and then in following month the mortgage loan payments were 90 days delinquent. This is unusual because three missed payments showed up at the same time in the delinquency history. Occurrences such as C to 9 are a red flag for the credit risk manager that the mortgagor is having problems making payments (the C to 9 might indicate that three mortgage payment checks bounced), or that the servicer is having difficulty with reporting (the missed payments were not caught by the servicer in a timely manner or were incorrectly reported), or that there is a problem elsewhere; any of which need investigation and correction. The delay status filter is used to filter by any of the factors that might be causing a liquidation delay, such as bankruptcy or litigation. The payment plan filter is used to filter all mortgage loans where the mortgagor is on a payment plan and the bankruptcy filter is used to filter all loans that are associated with a bankruptcy.

The Loan History risk filter group also includes an end date expiring subgroup having a payment plan end date filter, a bankruptcy estimated end date filter, a foreclosure estimated end date filter and an REO estimated end date filter. These filters allow a credit risk manager or other user of the system to identify mortgage loans that have an approaching estimated end date for one of the factors in the liquidation timing determination. For example, a particular mortgage loan or set of mortgage loans may have an estimated end date for bankruptcy proceedings. The credit risk manager can identify these loans using the bankruptcy estimated end date filter, and then add the mortgage loans to a watch list to later check on the status of the bankruptcy proceeding. If at that time the credit risk manager discovers that there are issues in completing the bankruptcy proceeding on time, the credit risk manager may be able to take mitigating activities that will help to facilitate the bankruptcy process and thereby reduce any losses to the investor based on the bankruptcy proceeding.

The end date expiring subgroup may also include a bankruptcy chapter filter, a litigation filter and a redemption date filter. These filters are useful for the credit risk manager to sort through a set of mortgage loans based on whether a particular bankruptcy chapter is associated with the mortgage loan, whether the mortgage loan is involved in litigation and what the projected redemption for a mortgage loan is. As discussed herein, particular bankruptcy chapters and litigation can indicate heightened risk of loss, heightened severity of loss, and can indicate significant delays in the liquidation timing. Accordingly, the credit risk manager can identify all loans in a set of loans having the particular characteristics sorted by the bankruptcy chapter filter, the litigation filter and the redemption date filter. By doing so, the credit risk manager can work to mitigate the losses associated with these particular mortgage loans.

These risk filters may also be used to help identify other characteristics of a mortgage loan pool or perhaps an emerging trend in a geographic area. For example, by sorting state and bankruptcy chapter or perhaps zip code and bankruptcy chapter, the credit risk manager or other user of the system might be able to identify geographical regions that are under economic stress. In this example, a high rate or particular bankruptcy chapters in a given geographic region as compared with other geographic regions might be indicative of distressed economic conditions in that geographic region. This type of information is not only useful in mitigating losses for investors, but is also useful in creating future securitized interests in mortgage loans and in correctly identifying risks associated with those securitized mortgage loans for investors.

Referring to FIG. 13B, a loan history risk filter user interface is shown, which generally corresponds with some of the filters identified in Table 7. In one example, the loan history user interface includes an exceeds timeline drop-down menu (to select and apply a particular exceeds timeline filter, e.g., estimated foreclosure timing), an unusual string drop-down menu (to select and apply one of the unusual string filters), a time-in status drop-down menu and number of months in status input field (used to select a particular status, e.g., 90 days delinquent, and how long in the status, e.g., 4 consecutive payments), an end date expiring drop-down menu (used to select and apply one of the end date expiring filters and to select a range of times to filter by the end date expiring filter), a paid-off button (used by the credit risk manager to indicate a loan has been paid-off), a bankruptcy chapter drop-down menu (used to select and apply a particular bankruptcy chapter, e.g., chapter 11, and filter by it), a delay status drop-down menu (to filter by a particular reason for delay in liquidation), and last interest paid date range input fields (to search for LIPDs that occurred in a specified time period).

TABLE 8

| Mortgage Insurer Filter Group | |
|---|---|
| Filter Group - Mortgage Insurance (MI) | Data Source |
| MI Claim Pending | Manual |
| MI Type | Manual |
|    Primary Home | Manual |
|    Secondary Home | Manual |
|    Lender Paid | Manual |
|    Pool | Manual |
| MI Loss | Manual |
| MI Issues | Manual |
| MI Severity (Range) | Manual |

Table 8 illustrates a set of Mortgage Insurance risk filters. The Mortgage Insurance risk filters include an MI claim pending filter, a MI type filter, a MI loss filter, a MI issues filter, and a MI severity filter. The MI loss filter is used to filter by a particular MI loss value or range of MI loss values. The MI severity filter is used to filter a set of mortgage loans by the MI severity associated with the loan. In one example, MI severity equals the actual MI loss divided by the original risk of loss. In one example, the risk of loss is the estimated loss (see FIGS. 5-11) multiplied by the probability of default (see FIGS. 12A-12C). The MI issue filter is used to identify loans that the credit risk manager or other user has identified as having some issue or problem associated with it. For example, if a MI claim has an unexplained cost associated with it, then that cost should be identified and resolved. Accordingly, the credit risk manger can mark the loan as having an MI issue, and later filter the set of mortgage loans being analyzed to identify all loans with a pending MI issue.

Referring to FIG. 13C, a MI risk filter user interface is illustrated, which generally corresponds with the MI risk filter group illustrated in Table 8. The MI user interface includes a mortgage insurer drop-down window (for selecting and applying a particular mortgage insurer), a mortgage insurance loss drop-down window (to select and apply the amount of mortgage insurance loss associated with a particular mortgage loan), a mortgage insurance severity range input windows (to input a mortgage insurer severity range to filter by), a mortgage insurance issues drop-down window (to select and apply a particular MI issue), a mortgage insurance type drop-down window (for selecting and applying one of the MI type filters), and a pending button (for identifying mortgage loans with a pending MI claim).

TABLE 9

Loss Exposure Filter Group

| Filter Group - Loss Exposure | Data Source |
| --- | --- |
| Estimated Severity (%) | Calculated |
| Estimated Probability (%) | Calculated |
| Estimated Loss | Calculated |
| Actual Loss from Property Sale | Manual |
| Actual Severity | Calculated |
| Underwritten by Servicer | Manual |
|   Requested - Pending | Manual |
|   Requested - Denied | Manual |
|   Requested - Cleared | Manual |
|   Completed - Issues | Manual |
| Underwritten by Credit Risk Manager | Manual |
|   Pending | Manual |
|   Cleared | Manual |
|   Issues | Manual |

Table 9 illustrates the Loss Exposure risk filter group. The loss exposure filter group include an estimated severity filter, an estimated probability filter, an estimated loss filter, an actual loss for the property sale filter, an actual severity filter, an underwritten by servicer subfilter group, and an underwritten by credit risk manager subfilter group.

Referring to FIG. 13B, a loss exposure or level 4 user interface is illustrated. The loss exposure user interface includes the estimated loss probability filter, the estimated severity probability filter, the probability risk filter, the actual loss risk filter and the actual severity risk filters identified in Table 9. Each of the loss exposure user interface filters allows the credit risk manager to enter a range in the corresponding windows. For example, if the credit risk manager would like to sort the set of mortgage loans by those loans having a probability of loss between 80% and 90%, 80 is entered in the first or left probability window and 90 is entered in the right window. After which, all mortgage loans with a probability of loss of between 80% and 90% will be identified.

The estimated loss filter sorts a set of mortgage loans based on the estimated loss for each mortgage loan. The estimated loss severity is the percentage obtained by dividing the estimated loss amount by the original balance of the mortgage loan.

Estimated Loss Severity=estimated loss/original balance of mortgage loan If a mortgage loan had a balance of $100,000 when it was taken out by the mortgagor, and an estimated loss of $5,000, then the estimated loss severity would be $5,000/$100,000=5%. The actual severity uses the actual loss in place of the estimated loss. Generally, the estimated loss is the difference, expressed in dollars, between the estimated net proceeds from sale of a property and the estimated total debt on a mortgage loan. The result may be either a gain (net proceeds exceed total debt on a mortgage loan) or a loss (net proceeds are less than total debt on a mortgage loan). In one example, an estimated gain is expressed as a negative estimated loss. The estimated loss calculation is described in detail in section II, Estimated Loss, above. The actual loss uses the actual proceeds from the sale of the property in place of the estimated property value, and the actual debt in place of the estimated debt.

The estimated loss probability filter provides an estimation of the likelihood, expressed as a percentage, that a loss will result when a mortgage loan is originated. This calculation is explained in detail in section III, Probability of Loss, above.

The Loss Exposure risk filter group further includes an underwritten by servicer subgroup and an underwritten by credit risk manager subgroup. Referring to FIG. 13B, an underwriting risk filter user interface is illustrated, which generally corresponds with the underwritten by servicer risk filter subgroup and the underwritten by credit risk manager subgroup illustrated in Table 9. Underwriting review generally refers to due diligence performed on the loan including reviewing the underwriting file for the loan having the original appraisal, the application, and any comments made by the loan originator. In one example, a credit risk manager or other user may request an underwriting review by the servicer, and the status of the underwriting review (pending, denied, cleared, and issues) may be tracked and filtered. In another example, an underwriting review may be performed by the credit risk manager, in which case the status (pending, cleared, and issues) of the credit risk manager underwriting review may be tracked and filtered. A status of "cleared" generally indicates that the underwriting review was performed and no problems with the underwriting files were uncovered. A status of "issues" indicates that the underwriting review was performed and one or more problems with the original underwriting file were uncovered and are being investigated. For example, if the mortgage loan is a full documentation mortgage loan, but the underwriting review indicates that the employment history of the borrower was never verified or tax returns were not obtained, then there would be a problem with the original underwriting and with the mortgage loan.

TABLE 10

Recovery Risk Filter Group

| Filter Group - Recoveries | Data Source |
| --- | --- |
| Recovery Expected | Manual |
| Recovery Actual | Manual |

Table 10 illustrates the Recovery risk filter group. In one example, the recovery risk filter group includes a recovery expected filter and a recovery actual filter. Generally, recovery refers to the quantitative value that the loss mitigation activities performed by the credit risk manager and other users of the system have provided. For example, if the credit risk manager identifies a loan that has been 90 days delinquent for four months and should be in foreclosure, and then contacts the servicer to correct the problem. Facilitating the identification of a loan that should be in foreclosure indicates that some recovery is expected. If the liquidation time line is improved by a total of four months due to the identification of the problem, and for each reduced month in liquidation there is a savings of $1000, then the expected recovery is $4000. The actual recovery might be some number more or less than $4000 depending on how much the liquidation timing is actually improved.

Referring to FIG. 13C, a recoveries user interface is illustrated, which generally corresponds with the recoveries risk filter group illustrated in Table 10. The recoveries user interface includes a recovery expected risk filter and a recovery actual risk filter. In one example, the recovery expected risk filter has a first window and a second window whereby the credit risk manager or other user can enter a range of expected recoveries. For example, if the expected recovery is between $100,000 and $200,000, then those ranges may be entered in the recovery expected windows and the mortgage loan pool sorted by those values. The same is generally true for the recovery actual risk filter, but the credit risk manager instead of entering the expected recovery enters in the actual recovery and the mortgage loan pool is sorted by actual recoveries.

The filters may be used individually, for instance, to identify all mortgage loans with properties in Hawaii, and they may be used sequentially. An example of sequential use would be to filter first for all mortgage loans in Hawaii (resulting in a list of, for example, 100 loans); next, from this list, filter for all mortgage loans that are in foreclosure (resulting in a list of for example, 10 loans); and, finally, from this list filter to all mortgage loans that are second liens (resulting in a list of, for example, one loan). The filters may be used in combination. An example of using the filters in combination would be filter for all mortgage loans in Hawaii, that are in foreclosure, and that are either first or second liens. Finally, the filters may be used iteratively. An example would be to filter first for all mortgage loans in Hawaii, next for all mortgage loans in Alaska, and then from the list of all mortgage loans in Hawaii and Alaska, filter for loans in foreclosure.

An exemplary loss mitigation function using risk filters would be to identify all mortgage loans on a given pool that are: Cash-out refinancings, high balance (defined as >$100,000), high LTV (defined as >80), low FICO (defined as <620), in a troubled geographic region (defined as zip codes beginning with "201"), that have been in 90 days delinquent for more than three months but are not in bankruptcy or on a payment plan. This would likely result in a very short list of loans (perhaps 5-10) from a possibly very long list of defaults (perhaps 1,000-3,000). From this list, an in-depth analysis might indicate that the mortgage loans are of such a low value that the lowest loss to the investor would come from writing them off now, rather than incurring further interest advances and foreclosure costs which would add to the loss.

Alternative configurations of the invention are envisioned. For example, software code embodying aspects of the invention may reside on the servicer or reside on a plurality of computing devices in a distributed manner. The invention can also be embodied as computer readable code on a computer readable medium. The computer readable medium being any storage device that can store data which can thereafter be read by a computer system. Examples of the computer readable medium include a read only memory, a random access memory, a storage area network, a memory stick, magnetic data storage devices such as diskettes, and optical storage devices such as CD-ROMS. The computer readable medium can also be distributed over a network coupled computer system so that the computer readable code is stored and executed in a distributed fashion. The computer readable code may also be distributed using a propagated signal receivable by the computer system and executable therein. The computer readable code may be written in any suitable programming language, and for any suitable computing platform. Some implementations of the present invention may be compiled into a platform-independent format, such as Java™ byte codes, or other formats that can be generated by standard development tools as are well known in the art.

While the methods disclosed herein have been described and shown with reference to particular operations performed in a particular order, it will be understood that these operations may be combined, sub-divided, or re-ordered to form an equivalent method without departing from the teachings of the present invention. Accordingly, unless specifically indicated herein, the order and grouping of the operations is not a limitation of the present invention.

While various embodiments of the invention have been particularly shown and described, it will be understood by those skilled in the art that various other changes in the form and details may be made without departing from the spirit and scope of the invention, which is defined by the following claims.

What is claimed is:

1. A method for analyzing an electronic record of a loan pool wherein the loan pool includes an electronic record of at least one loan having an associated property, the method comprising:
   employing at least one processing unit in communication with a database, accessing the database storing an electronic record of a securitized loan pool with an electronic record of a plurality of loans, each of the plurality of loans including an associated property;
   employing the at least one processor, obtaining an estimated liquidation time between a last interest paid date for the at least one loan and a receipt of a net proceeds from a sale of the property after a foreclosure of the loan, the last interest paid date being the last date that a payment was received on the loan before entering foreclosure, wherein the operation of obtaining an estimated liquidation time includes applying a liquidation time value decision tree, wherein the liquidation time value decision tree includes a plurality of time factors that account for the time associated with events that effect the liquidation time for the loan, the application of the liquidation time value decision tree including summing each time factor applicable to the loan, the plurality of time factors including at least:
      a first time factor to account for a payment plan associated with the at least one loan;
      a second time factor to account for a bankruptcy proceeding associated with the at least one loan;
      a third time factor to account for litigation associated with the at least one loan;
      a fourth time factor to account for foreclosure proceedings associated with the at least one loan;
      a fifth time factor to account for a delinquency status of the at least one loan; and
      a sixth time factor to account for a marketing period to sell the property;
   employing the at least one processor, associating the estimated liquidation time with the electronic record of the at least one loan; and
   employing the at least one processor, applying at least one liquidation time filter to the electronic record of the loan pool to identify each at least one loan with a specified estimated liquidation time, employing the at least one processor, providing a loss mitigation action for the loan pool based on an assessment of each of the at least one loans having the specified estimated liquidation time, the loss mitigation action comprising at least one of identifying an underperforming loan servicer associated with the at least one loan, identifying a delay in a foreclosure proceeding associated with the at least one loan, identifying a delay in a bankruptcy proceeding associated with the at least one loan, and identifying a delay associated with a litigation associated with the least one loan.

2. The method of claim 1 wherein the operation of applying a liquidation time value decision tree includes obtaining the first time factor to account for the payment plan associated with the at least one loan;
  wherein the operation of associating further includes associating the first time factor with the electronic record of the at least one loan; and
  wherein the operation of applying includes applying a payment plan liquidation time filter to identify each at least one loan with a specified first time factor to account for a payment plan.

3. The method of claim 2 further including the operation of applying the payment plan liquidation time filter to identify each at least one loan that exceeds the specified first time factor.

4. The method of claim 2 wherein the operation of obtaining a first time factor to account for a payment plan includes:
  determining an end date for the payment plan;
  determining a current date;
  subtracting the current date from the end date for the payment plan; and
  wherein the operation of subtracting generates the first time factor to account for a payment plan.

5. The method of claim 1 wherein the operation of applying a liquidation time value decision tree includes obtaining the second time factor to account for the bankruptcy proceeding associated with the at least one loan;
  wherein the operation of associating further includes associating the second time factor with the electronic record of the at least one loan; and
  wherein the at least one liquidation time filter includes a bankruptcy liquidation time filter to identify each at least one loan with a specified second time factor to account for a bankruptcy.

6. The method of claim 5 further including the operation of applying the bankruptcy liquidation time filter to identify each at least one loan that exceeds the specified second time factor.

7. The method of claim 6 wherein the operation of obtaining a second time factor to account for a bankruptcy proceeding associated with the at least one loan includes:
  determining whether a chapter thirteen bankruptcy proceeding, a chapter seven bankruptcy proceeding, a chapter twelve bankruptcy proceeding, or another chapter bankruptcy proceeding is associated with the at least one loan;
  setting the second time factor to three months if the chapter thirteen bankruptcy proceeding is associated with the at least one loan;
  setting the second time factor to six months if the chapter seven bankruptcy proceeding is associated with the at least one loan;
  setting the second time factor to twelve months if the chapter eleven bankruptcy proceeding is associated with the at least one loan; and
  setting the second time factor to three months if another bankruptcy proceeding or an unidentified bankruptcy proceeding is associated with the at least one loan.

8. The method of claim 1 wherein the operation of applying a liquidation time value decision tree includes obtaining the third time factor to account for litigation associated with the at least one loan;
  wherein the operation of associating further includes associating the third time factor with the electronic record of the at least one loan; and
  wherein the at least one liquidation time filter includes a litigation liquidation time filter to identify each at least one loan with a specified third time factor to account for litigation.

9. The method of claim 8 further including the operation of applying the litigation liquidation time filter to identify each at least one loan that exceeds the specified third time factor.

10. The method of claim 9 wherein the operation of obtaining a third time factor to account for litigation associated with the at least one loan includes:
  determining if there is litigation associated with the at least one loan, and
  setting the third time factor to twelve months if there is litigation associated with the at least one loan.

11. The method of claim 1 wherein the operation of applying a liquidation time value decision tree includes obtaining the fourth time factor to account for foreclosure proceedings associated with the at least one loan;
  wherein the operation of associating further includes associating the fourth time factor with the electronic record of the at least one loan; and
  wherein the at least one liquidation time filter includes a foreclosure liquidation time filter to identify each at least one loan with a specified fourth time factor to account for foreclosure proceedings.

12. The method of claim 11 further including the operation of applying the foreclosure liquidation time filter to identify each at least one loan that exceeds the specified fourth time factor.

13. The method of claim 11 wherein the operation of obtaining a fourth time factor to account for foreclosure proceedings associated with the at least one loan includes:
  determining a foreclosure start date;
  determining a current date;
  subtracting the foreclosure start date from the current date; and
  wherein the operation of subtracting yields the fourth time factor.

14. The method of claim 1 wherein the operation of applying a liquidation time value decision tree includes obtaining the fifth time factor to account for the delinquency status of the at least one loan;
  wherein the operation of associating further includes associating the fifth time factor with the electronic record of the at least one loan; and
  wherein the at least one liquidation time filter includes a delinquency liquidation time filter to identify each at least one loan with a specified fifth time factor to account for delinquency status.

15. The method of claim 14 further including the operation of applying the delinquency liquidation time filter to identify each at least one loan that exceeds the specified fifth time factor.

16. The method of claim 14 wherein the operation of determining a fifth time factor to account for a delinquency status of the at least one loan includes:

determining whether the at least one loan has a delinquency status of current, 30 days delinquent, 60 days delinquent, or 90 days delinquent;

setting the fifth time factor to two months if the delinquency status is 30 days delinquent;

setting the fifth time factor to one month if the delinquency status is 60 days delinquent;

setting the fifth time factor to zero months if the delinquency status is 90 days delinquent;

and setting the fifth time factor to three months if the delinquency status is current.

17. The method of claim 1 wherein the operation of applying a liquidation time value decision tree includes obtaining the sixth time factor to account for the marketing period to sell the property;

wherein the operation of associating further includes associating the sixth time factor with the electronic record of the at least one loan; and wherein the at least one liquidation time filter includes a marketing period liquidation time filter to identify each at least one loan with a specified sixth time factor to account for a marketing period.

18. The method of claim 17 further including the operation of applying the marketing period estimated liquidation time filter to identify each at least one loan that exceeds the specified sixth time factor.

19. The method of claim 17 wherein the operation of determining a sixth time factor to account for a marketing period to sell the property includes:

determining if an eviction is required;

adding two months to the sixth time factor if the eviction is required;

determining if the property is a co-op;

adding three months to the sixth time factor if the property is a co-op;

determining if the property is located in a depressed region;

adding twelve months to the sixth time factor if the property is in a depressed region;

determining if the property is in bad condition;

adding six months to the sixth time factor if the property is in bad condition;

determining if the property has a value that exceeds a specified value; and adding two months to the sixth time factor if the property value exceeds the specified value.

* * * * *